(12) United States Patent
Lee et al.

(10) Patent No.: US 11,999,478 B2
(45) Date of Patent: Jun. 4, 2024

(54) GRIPPING MECHANISM AND TRANSPORTATION ARTICLE CONVEYANCE DEVICE

(71) Applicant: RAKUTEN GROUP, INC., Tokyo (JP)

(72) Inventors: Kenichi Lee, Tokyo (JP); Takumi Yamato, Tokyo (JP); Takayoshi Inuma, Tokyo (JP); Osamu Igarashi, Yokohama (JP); Kyota Yamaoka, Sagamihara (JP)

(73) Assignee: RAKUTEN GROUP, INC., Tokyo (JP)

( * ) Notice: Subject to any disclaimer, the term of this patent is extended or adjusted under 35 U.S.C. 154(b) by 407 days.

(21) Appl. No.: 17/311,428

(22) PCT Filed: Dec. 2, 2019

(86) PCT No.: PCT/JP2019/047058
§ 371 (c)(1),
(2) Date: Jun. 7, 2021

(87) PCT Pub. No.: WO2020/116401
PCT Pub. Date: Jun. 11, 2020

(65) Prior Publication Data
US 2022/0024581 A1 Jan. 27, 2022

(30) Foreign Application Priority Data
Dec. 5, 2018 (JP) ................ 2018-228167

(51) Int. Cl.
*B25J 15/08* (2006.01)
*B25J 15/02* (2006.01)
(Continued)

(52) U.S. Cl.
CPC ........... *B64C 39/024* (2013.01); *B25J 15/026* (2013.01); *B25J 15/08* (2013.01); *B64D 1/22* (2013.01);
(Continued)

(58) Field of Classification Search
CPC ......... B64C 39/02; B64C 39/024; B64D 9/00; B25J 15/08; B25J 15/026; F16H 19/04
(Continued)

(56) References Cited

U.S. PATENT DOCUMENTS 5,033,933 A * 7/1991 Sinclair ................... B66F 9/183
414/607
5,163,729 A * 11/1992 Borcea ................... B25J 15/026
294/207

(Continued)

FOREIGN PATENT DOCUMENTS

| JP | 52-122475 U | 9/1977 |
|---|---|---|
| JP | 61-004687 U | 1/1986 |

(Continued)

OTHER PUBLICATIONS

International Search Report for PCT/JP2019/047058 dated Jan. 7, 2020 [PCT/ISA/210].

(Continued)

*Primary Examiner* — Paul T Chin
(74) *Attorney, Agent, or Firm* — Sughrue Mion, PLLC

(57) ABSTRACT

A gripping mechanism is attached to a mobile body to grip and convey a transportation article. The gripping mechanism includes a pinion provided to be rotatable about a rotation axis, and a first arm and a second arm disposed with the rotation axis being the center to be separated from the rotation axis by the same distance to grip the transportation article. When the pinion rotates in a predetermined direction, the first arm and the second arm move toward the rotation axis.

8 Claims, 16 Drawing Sheets

(51) Int. Cl.
*B64C 39/02* (2023.01)
*B64D 1/22* (2006.01)
*B64D 9/00* (2006.01)
*F16H 19/04* (2006.01)
*B64U 101/60* (2023.01)

(52) U.S. Cl.
CPC ............... *B64D 9/00* (2013.01); *F16H 19/04* (2013.01); *B64U 2101/60* (2023.01)

(58) Field of Classification Search
USPC ...................................................... 294/119.1
See application file for complete search history.

(56) References Cited

U.S. PATENT DOCUMENTS

| | | | | |
|---|---|---|---|---|
| 5,253,912 | A | * | 10/1993 | Andorlini ................ B25J 15/02 294/902 |
| 5,639,136 | A | * | 6/1997 | Rosengren ........... B25J 17/0241 294/115 |
| 6,152,214 | A | * | 11/2000 | Wagner ................. H01L 23/467 165/125 |
| 6,394,521 | B1 | * | 5/2002 | Bertini ................... B25J 15/026 294/207 |
| 6,428,071 | B2 | * | 8/2002 | Bertini ................... B25J 15/026 294/207 |
| 8,905,452 | B2 | * | 12/2014 | Williams ................... B25B 1/06 294/207 |
| 11,014,250 | B2 | * | 5/2021 | Iwazaki .................. B25J 15/026 |
| 11,078,062 | B2 | * | 8/2021 | Andriolo .................. B66F 9/147 |
| 11,292,140 | B2 | * | 4/2022 | Motowaki ............. B25J 15/026 |
| 2019/0351562 | A1 | * | 11/2019 | Iwazaki ..................... B25J 15/08 |

FOREIGN PATENT DOCUMENTS

| | | |
|---|---|---|
| JP | 07-061583 A | 3/1995 |
| JP | 2005-091862 A | 4/2005 |
| JP | 2017-087898 A | 5/2017 |
| JP | 2017-196949 A | 11/2017 |
| JP | 2018-114822 A | 7/2018 |

OTHER PUBLICATIONS

Written Opinion for PCT/JP2019/047058 dated Jan. 7, 2020 [PCT/ISA/237].

* cited by examiner

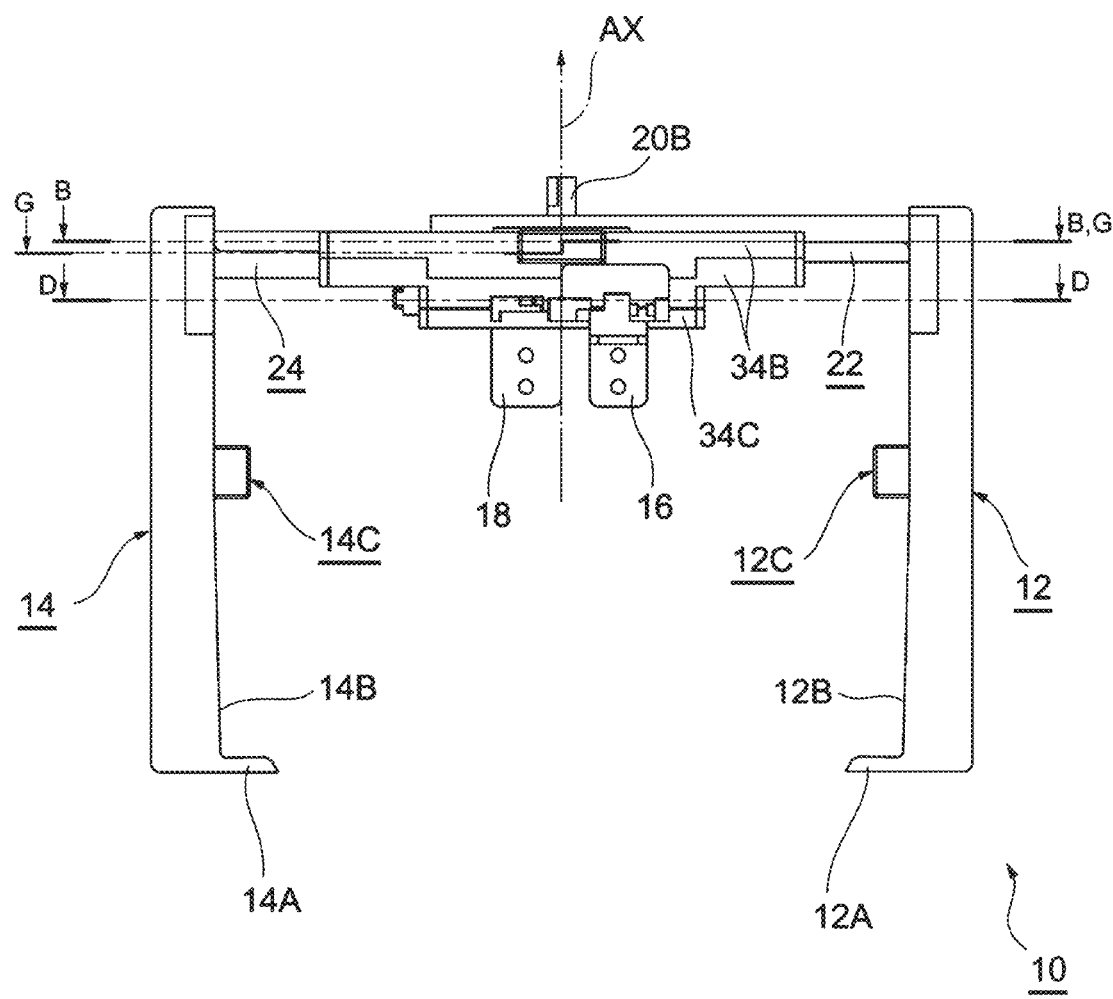

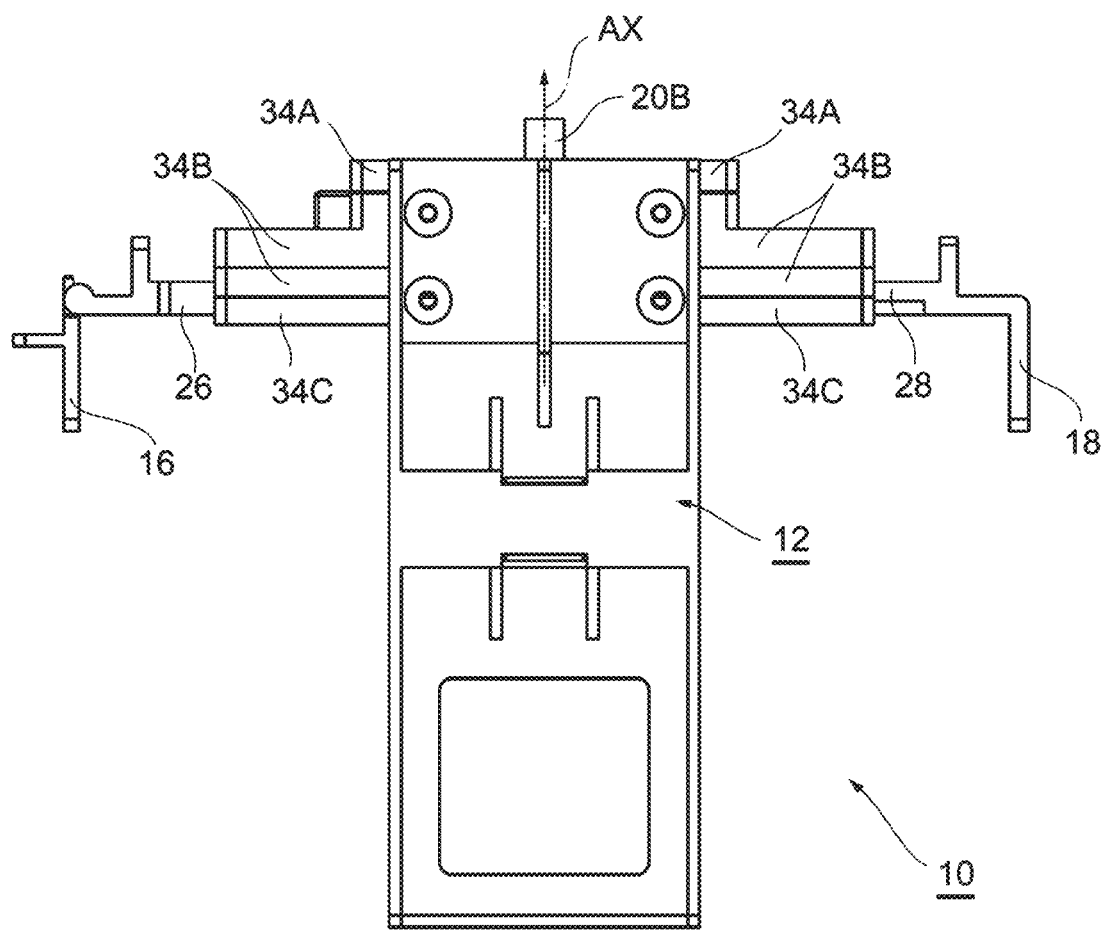

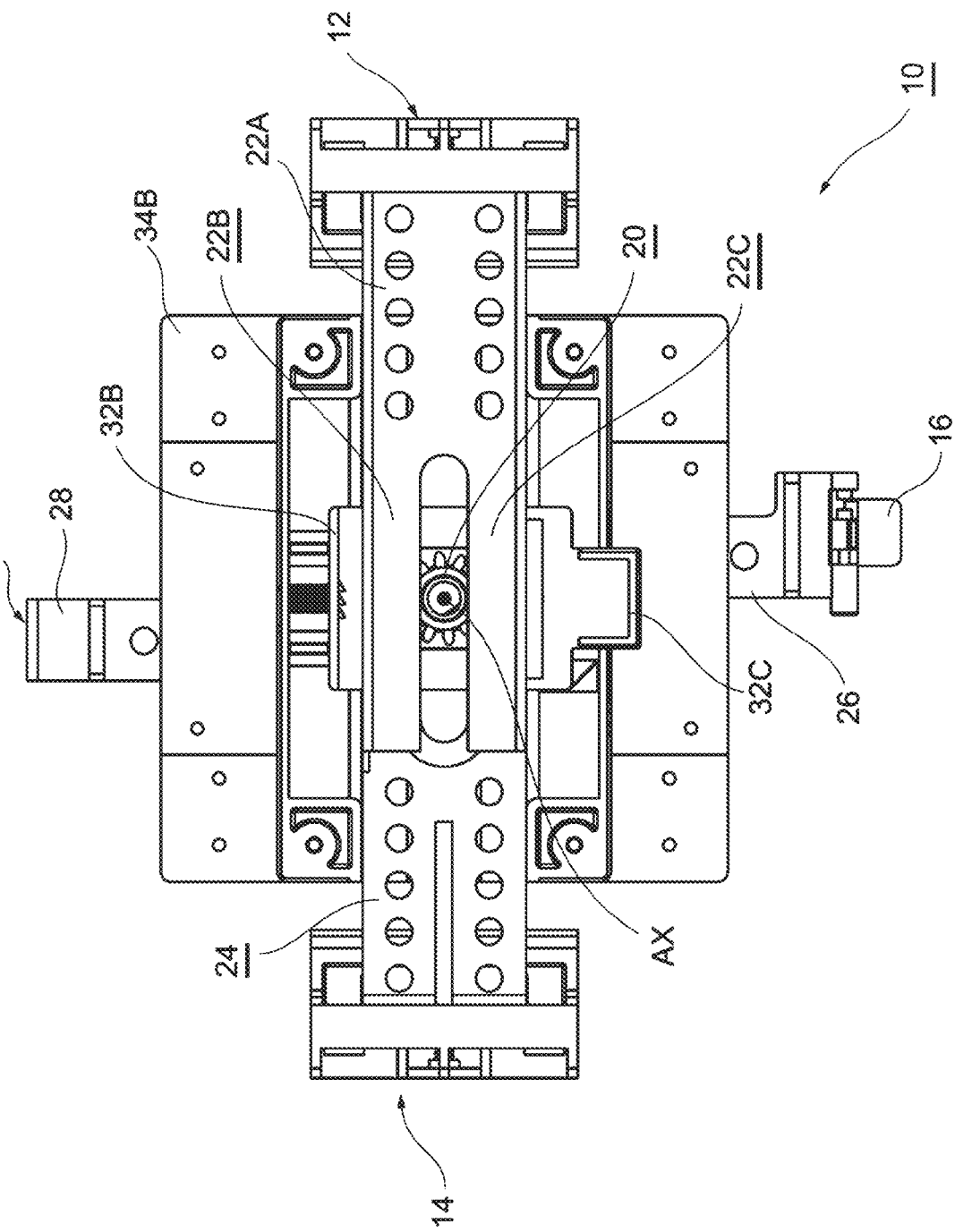

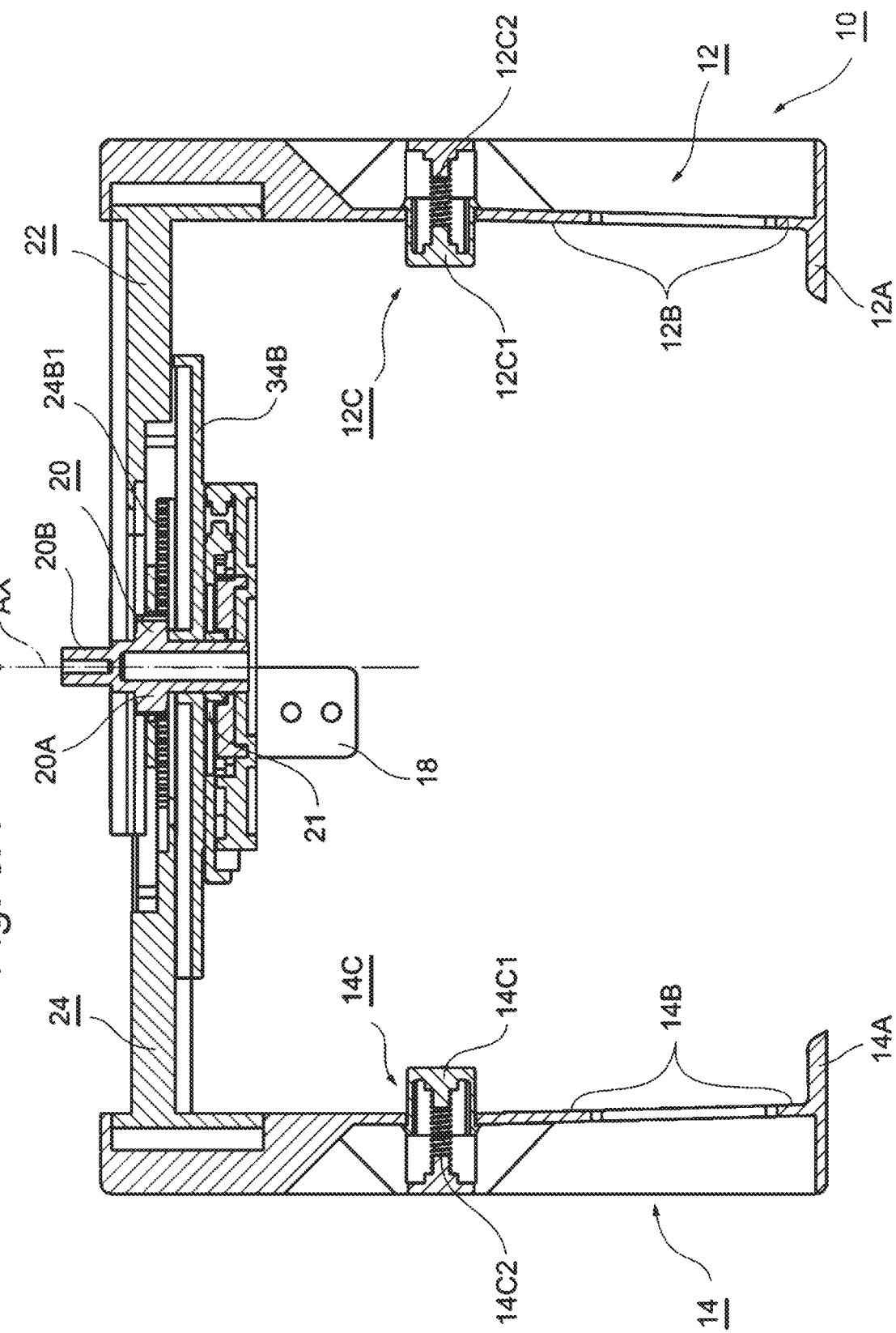

GRIPPING MECHANISM AND TRANSPORTATION ARTICLE CONVEYANCE DEVICE

CROSS REFERENCE TO RELATED APPLICATIONS

This application is a National Stage of International Application No. PCT/JP2019/047058 filed Dec. 2, 2019, claiming priority based on Japanese Patent Application No. 2018-228167 filed Dec. 5, 2018, the entirety of which is incorporated herein by reference.

TECHNICAL FIELD

The present invention relates to a gripping mechanism and a transportation article conveyance device.

BACKGROUND ART

In recent years, there have been proposed a transportation article conveyance method for delivering a transportation article, such as luggage, by using an unmanned aerial vehicle called a drone, a multirotor, or a multicopter, which is autonomously controlled by remote control or autopilot (including an unmanned aerial vehicle that is autonomously controlled by installing artificial intelligence that performs machine learning), and a transportation article gripping mechanism called a catcher.

Patent Document 1 describes a transportation article gripping device that is lightweight and has low power consumption. This document describes a technique for attracting and gripping a transportation article by magnetic force by using a permanent electromagnetic magnet device that loses magnetic force when energized and generates magnetic force when not energized.

Patent Document 2 describes a device capable of dropping a transportation article vertically downward to a target point. This document describes a technique for rotating two bottom plates, which are inclined in a vertical direction, at the same time and in a symmetrical trajectory, thereby dropping a transportation article supported by the two bottom plates.

Patent Document 3 describes a conveying device that minimizes the possibility of destabilizing the attitude of an unmanned aerial vehicle caused by an operation of attaching a transportation article to a flexible member hanging down from the unmanned aerial vehicle while hovering. This document describes a technique for connecting a long auxiliary wire to a main wire made of a long flexible member, and attaching a transportation article to the auxiliary wire.

CITATION LIST

Patent Documents

Patent Document 1: Japanese Patent Application Laid-Open No. 2018-114822
Patent Document 2: Japanese Patent Application Laid-Open No. 2017-196949
Patent Document 3: Japanese Patent Application Laid-Open No. 2017-87898

SUMMARY

Technical Problem

However, the technique described in Patent Document 1 is not suitable for gripping transportation articles of various sizes, since the technique can only attract transportation articles of sizes that the electromagnetic force of a magnet can cover. Further, the technique described in Patent Document 2 is not suitable for stably conveying rectangular parallelepiped-shaped transportation articles, since a transportation article must be supported by two inclined bottom plates. Further, according to the technique described in Patent Document 3, a transportation article is suspended and conveyed with a long wire, so that the stability of the transportation article may be significantly impaired when the transportation article is subjected to wind or the like.

Therefore, an object of the present invention is to provide a gripping mechanism and a transportation article conveyance device that enable stable gripping of transportation articles of various sizes.

Solution to Problem

A gripping mechanism according to one aspect of the present disclosure is attached to a moving body so as to grip and convey a transportation article. Further, the gripping mechanism includes: a rotating body provided so as to be rotatable about a rotation axis; a first arm and a second arm disposed so as to be separated from the rotation axis by the same distance, with the rotation axis as a center, in order to grip the transportation article; and a width adjusting mechanism which engages with the rotating body, the first arm and the second arm and which is configured such that the first arm and the second arm move toward the rotation axis in the case where the rotating body rotates about the rotation axis in a predetermined direction, and the first arm and the second arm move away from the rotation axis in the case where the rotating body rotates about the rotation axis in a direction opposite from the predetermined direction.

The rotating body may include a pinion on which a pinion gear is formed, and the width adjusting mechanism may include a first rack on which a first rack gear meshing with the pinion gear is formed and which is connected with the first arm, and a second rack on which a second rack gear meshing with the pinion gear is formed and which is connected with the second arm.

In addition, the gripping mechanism may further include a ratchet (a locking means, which may be called a stopper) for suppressing the movement of the first arm and the second arm away from the rotation axis. The ratchet can include a first engagement portion that engages with the first rack, a second engagement portion that engages with the second rack, and an elastic member for pressing the first rack and the second rack in a direction perpendicular to the moving direction of the first arm and the second arm by the first engagement portion and the second engagement portion.

Further, the gripping mechanism may further include: a second rotating body provided so as to be rotatable about a second rotation axis; a third arm and a fourth arm disposed so as to be separated from the second rotation axis by the same distance, with the second rotation axis as a center, in order to grip a transportation article; and a second width adjusting mechanism which engages with the second rotating body, the third arm and the fourth arm, and which is configured such that the third arm and the fourth arm move toward the rotation axis in the case where the second rotating body rotates about the second rotation axis in a predetermined direction, and the third arm and the fourth arm move away from the rotation axis in the case where the second rotating body rotates about the second rotation axis in a direction opposite from the predetermined direction, wherein the moving directions of the first arm and the second arm and the moving directions of the third arm and the fourth arm may have a perpendicular relationship.

Further, the present disclosure includes a transportation article conveyance device provided with a moving body constituted of an unmanned aerial vehicle, and a gripping mechanism attached to a bottom of the unmanned aerial vehicle. The gripping mechanism can be attached such that a straight line which passes through the center of gravity of the unmanned aerial vehicle and extends in a vertical direction coincides with the rotation axis of the rotating body. In particular, when the unmanned aerial vehicle has a plurality of frames that are rotationally symmetrical with respect to a predetermined central axis and a propeller attached to each frame, the gripping mechanism is preferably attached to the unmanned aerial vehicle such that the gripping mechanism is supported at a position on the frames rotationally symmetrical with respect to the central axis.

BRIEF DESCRIPTION OF DRAWINGS

FIG. 2 is a front view of the gripping mechanism 10;
FIG. 3 is a right side view of the gripping mechanism 10;
FIG. 4 is a plan view of the gripping mechanism 10;
FIG. 5A is a sectional view of the gripping mechanism 10, being parallel to a first direction and passing through a rotation axis AX.

DESCRIPTION OF EMBODIMENTS

The following will describe embodiments of the present invention with reference to the accompanying drawings. The following embodiments are examples for explaining the present invention, and the present invention is not intended to be limited only to the embodiments. Further, the present invention can be modified in various forms as long as modifications do not deviate from the gist thereof. For example, some constituent elements in an embodiment can be combined with other embodiments within the range of normal creative abilities of those skilled in the art.

Figure 1:
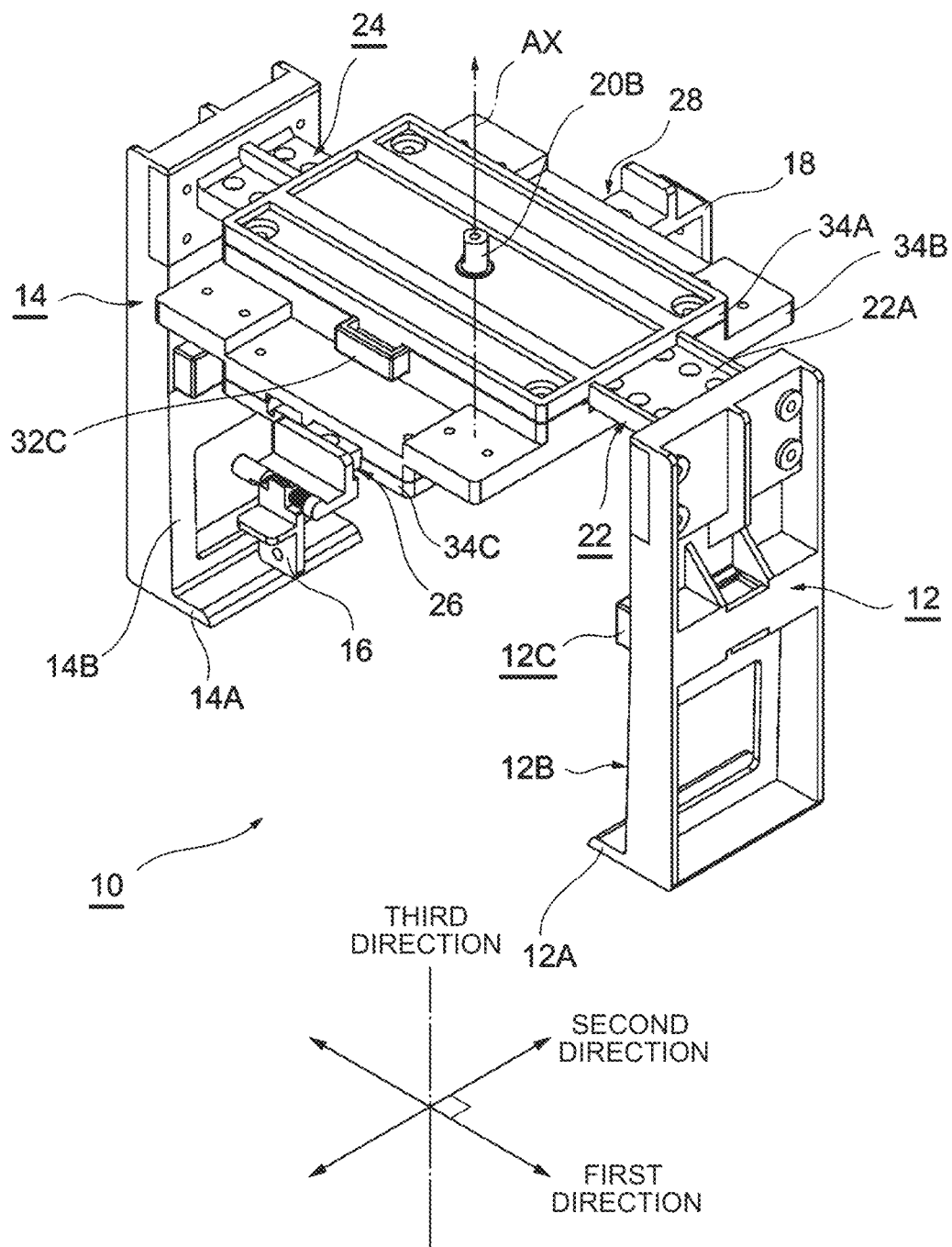
FIG. 1 is a perspective view of a gripping mechanism 10.

FIG. 1 is a perspective view of a gripping mechanism 10 according to the present embodiment. FIG. 2, FIG. 3, and FIG. 4 are a front view, a right side view, and a plan view, respectively, of the gripping mechanism 10. However, for the sake of clarity, FIG. 2 and FIG. 4 illustrate the front view and the plan view, respectively, of the gripping mechanism 10 in a state in which a cover body 34A for protecting a width adjusting mechanism from dust and the like has been removed.

As illustrated in these drawings, the gripping mechanism 10 has a first arm 12, a second arm 14, a third arm 16, and a fourth arm 18 for gripping a transportation article, such as luggage. Further, at the center of the gripping mechanism 10, a pinion 20 (FIG. 4) is provided so as to be rotatable about a rotation axis AX parallel to a vertical direction. In addition, the gripping mechanism 10 has, as a width adjusting mechanism of the first arm 12 and the second arm 14, a first rack 22 that engages with the first arm 12 and the pinion 20, and a second rack 24 that engages with the second arm 14 and the pinion 20. Further, the gripping mechanism 10 has, as a width adjusting mechanism of the third arm 16 and the fourth arm 18, a third rack 26 that engages with the third arm 16 and a pinion 21, respectively (FIG. 5A) (FIG. 8), and a fourth rack 28 that engages with the fourth arm 18 and the pinion 21. When the pinion 20 rotates clockwise, the first arm 12 and the second arm 14 move away from the rotation axis AX, and when the pinion 20 rotates counterclockwise, the first arm 12 and the second arm 14 move toward the rotation axis AX, which will be described in detail later. Therefore, the distance between the first arm 12 and the rotation axis AX and the distance between the second arm 14 and the rotation axis AX are substantially the same regardless of the positions of the arms.

Similarly, when the pinion 21 rotates clockwise, the third arm 16 and the fourth arm 18 move away from the rotation axis AX, and when the pinion 21 rotates counterclockwise, the third arm 16 and the fourth arm 18 move toward the rotation axis AX. Therefore, the distance between the third arm 16 and the rotation axis AX and the distance between the fourth arm 18 and the rotation axis AX are substantially the same regardless of the positions of the arms.

Hereinafter, for convenience, the direction in which the first arm 12 and the second arm 14 move is defined as a first direction, the direction in which the third arm 16 and the fourth arm 18 move is defined as a second direction, and the direction parallel to the rotation axis AX is defined as a third direction. The first direction, the second direction, and the third direction have a mutually perpendicular relationship. Further, when the rotation axis AX becomes parallel to the vertical direction, the first direction and the second direction become parallel to the horizontal direction.

The components of the gripping mechanism 10 can be manufactured by, for example, resin molding. However, the manufacturing method is not limited to resin molding, and some or all of the components of the gripping mechanism 10 may be manufactured using other materials, e.g., aluminum or other metals. Further, the components of the gripping mechanism 10 can be connected by bolts, as necessary. However, connecting the components is not limited to using bolts, and may be connected, for example, with other means, such as bonding, or the components may be integrally provided. For example, the third arm 16 and the third rack 26, and the fourth arm 18 and the fourth rack 28, respectively, may be integrally manufactured.

The first arm 12 is a component that comes in contact with a transportation article to grip the transportation article. The first arm 12 is formed to have a predetermined width in the second direction and a predetermined height in the third direction. The width in the second direction is set to be wider than the first rack 22 so as to be capable of stably conveying a transportation article. The height in the third direction is set to be larger than the maximum height of an expected transportation article. The lower end of the first arm 12 in the third direction has a projecting portion 12A, which has a predetermined width in the second direction and projects toward the rotation axis AX in the first direction. The projecting portion 12A has a horizontal surface facing upward in the third direction, so that the lower surface of a transportation article can be appropriately supported by being brought into contact with the horizontal surface. Further, the first arm 12 has a contact surface 12B, which is formed to be perpendicular to the first direction, and faces the direction of the rotation axis AX, so that a transportation article can be appropriately supported by bringing the contact surface 12B into contact with a side surface of the transportation article. As illustrated in FIG. 1, the central portion of the first arm 12 may be hollowed out to reduce weight. Further, the first arm 12 is formed to be symmetrical with respect to a plane which is perpendicular to the second direction and passes through the rotation axis AX. The widths, the heights, and shapes of the first to the fourth arms 12 to 18 can be appropriately designed according to the size and the shape of a transportation article to be gripped. For example, the widths and the heights of the first arm 12 and the second arm 14 can be set to 100 to 150 mm and 200 to 300 mm, respectively. However, depending on the size or the like of a transportation article to be conveyed, the first arm 12 and the second arm 14 may be detached, and different first arm and second arm may be attached.

Figure 5B:
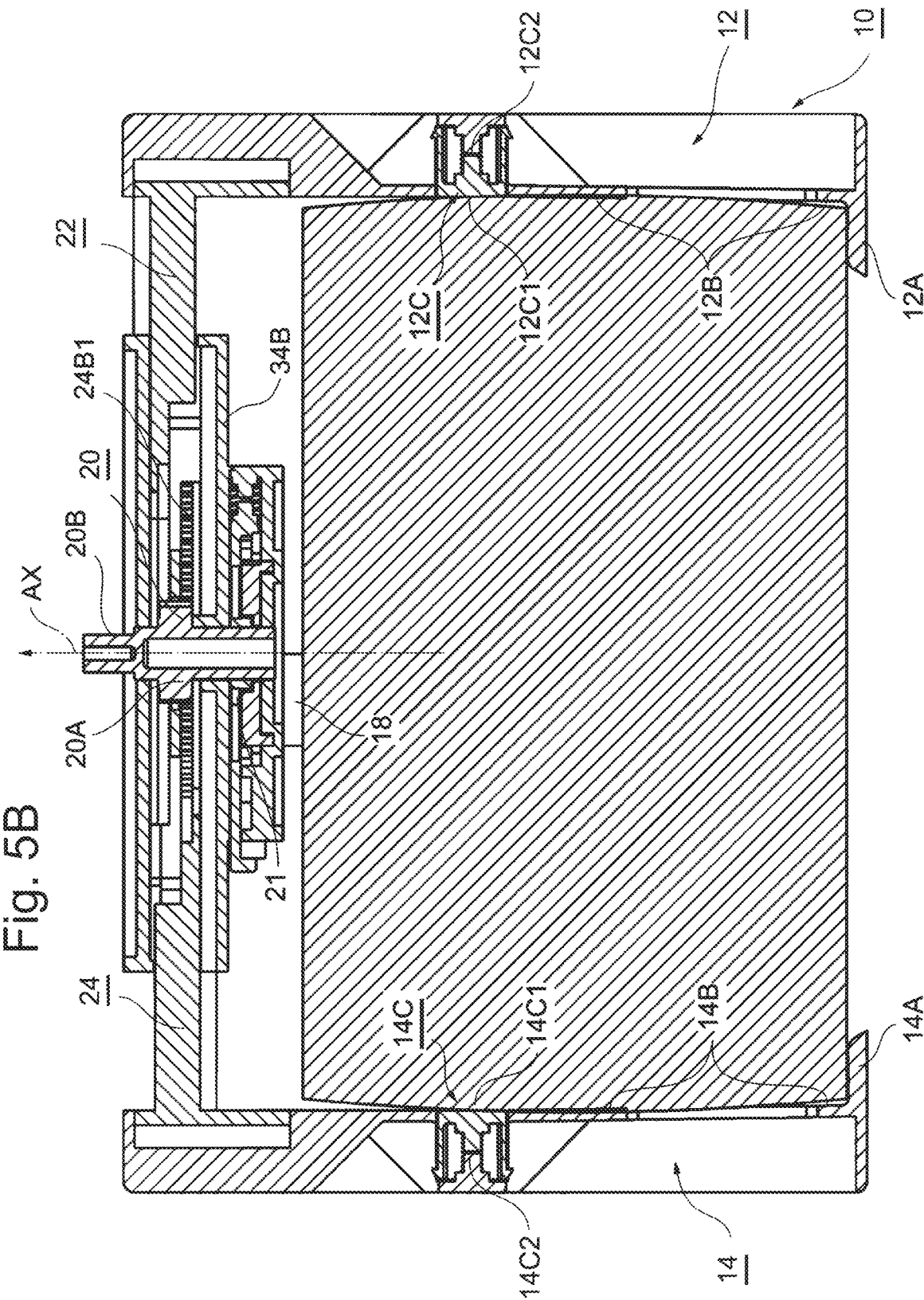
FIG. 5B is the same sectional view, in which a transportation article is being gripped.

As illustrated in FIG. 5A and FIG. 5B, the first arm 12 is further provided with a pressing mechanism 12C for pressing a transportation article toward the rotation axis AX. The pressing mechanism 12C presses a side surface of a transportation article opposing the first arm 12 during the conveyance of the transportation article. Further, the pressing mechanism 12C projects from the contact surface 12B of the first arm 12 and continues to press the transportation article when a destination is reached, and the first arm 12 moves away from the rotation axis AX to separate from the side surface of the transportation article so as to release the transportation article.

FIG. 5A is a sectional view of the gripping mechanism 10 cut by a plane which is parallel to the first direction and passes through the rotation axis AX. FIG. 5B is the same sectional view illustrating a state in which the gripping mechanism 10 is gripping a transportation article. The pressing mechanism 12C has a rectangular parallelepiped-shaped pressing component 12C1 provided near the center in the second direction and the third direction and a spring 12C2 that engages with the pressing component 12C1 in the first arm 12. The surface of the pressing component 12C1 facing the rotation axis AX is formed to be perpendicular to the first direction so as to be capable of appropriately pressing a side surface of a transportation article. The spring 12C2 is provided such that the pressing component 12C1 engaged with the spring 12C2 can move relative to the remaining portion of the first arm 12 in the first direction by expanding and contracting in the first direction. More specifically, as illustrated in FIG. 5A, when no transportation article is being gripped, the spring 12C2 has a natural length and supports the pressing component 12C1 such that the pressing component 12C1 protrudes in the first direction, i.e., toward the rotation axis AX, with respect to the contact surface 12B. On the other hand, as illustrated in FIG. 5B, when a transportation article is being gripped, the spring 12C2 is compressed and supports the pressing component 12C1 such that the pressing component 12C1 is flush with the contact surface 12B or slightly protrudes in the first direction, i.e., toward the rotation axis AX, in a state in which the pressing component 12C1 is in contact with a side surface of the transportation article. Then, when a destination is reached and the transportation article is released, the first arm 12 moves away from the rotation axis AX and therefore the contact surface 12B separates from the side surface of the transportation article, whereas the pressing component 12C1 is relatively moved by the spring 12C2 to protrude from the contact surface 12B. Consequently, the pressing component 12C1 continues to press the transportation article until the spring 12C2 restores the natural length. The elastic constant of the spring 12C2 can be appropriately set in consideration of the strength or the like of the outer box of the transportation article. For example, when the outer box is made of a member such as corrugated cardboard, the strength in the lateral direction of which is not high, if the elastic constant of the spring 12C2 is set to be too small, then the bottom box may be damaged. Therefore, the spring 12C2 is preferably designed to have a large elastic constant. Similarly, the area of a portion of the pressing component 12C1 that comes in contact with the transportation article is preferably designed so as to have an area that does not damage the outer box. The contact surface 12B does not necessarily have to be in close contact with the side surface of the transportation article. For example, a configuration may be adopted, in which the contact surface 12B is separated from and opposed to the side surface of the transportation article to such an extent so as to be capable of restraining the movement of the transportation article in the first direction during conveyance.

The second arm 14 has the same structure as the first arm 12, so that the description thereof will be simplified. As with the first arm 12, the second arm 14 also includes a projecting portion 14A that has a horizontal surface facing upward in the third direction to support the lower surface of a transportation article, and a contact surface 14B which is perpendicular to the first direction and faces the direction of the rotation axis AX to support a side surface of a transportation article. The second arm 14 further includes a pressing mechanism 14C, which presses a central portion of a side surface of the transportation article facing the second arm 14 during the conveyance of the transportation article, which protrudes from the contact surface 14B of the second arm 14 to continue pressing the transportation article when the second arm 14 moves away from the rotation axis AX to separate from the side surface of the transportation article so as to release transportation article upon reaching a destination, and which includes a pressing component 14C1 and a spring 14C2. Further, the second arm 14 is also formed to be symmetrical with respect to a plane which is perpendicular to the first direction and passes through the rotation axis AX.

Figure 6:
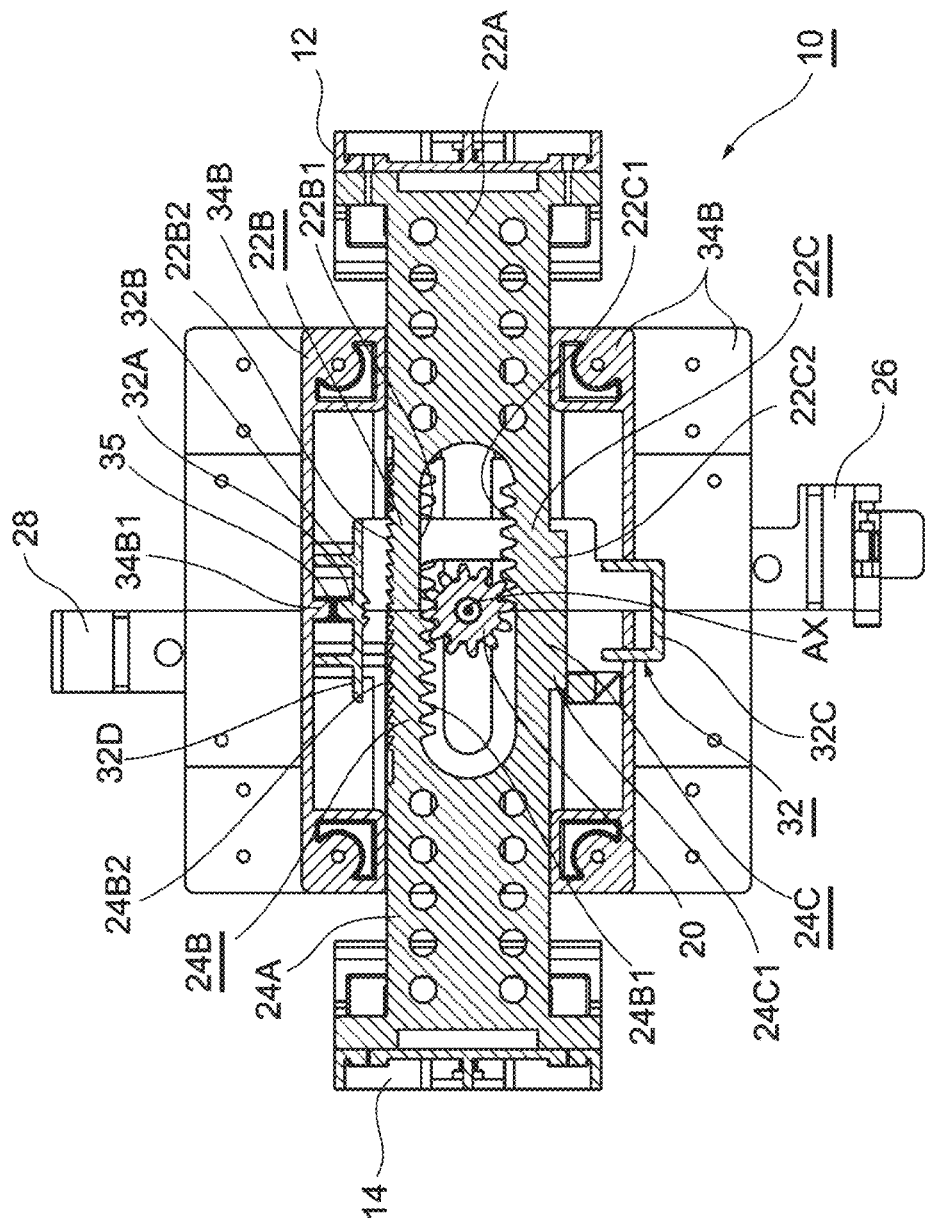
FIG. 6 is a sectional view passing through a side surface of a first rack 22 and a side surface of a second rack 24.

Next, a description will be given of the first rack 22 and the second rack 24 provided in the width adjusting mechanism with reference to the drawings. As illustrated in FIG. 1 and the like, the first rack 22 and the second rack 24 are supported by being inserted in the gap between the cover body 34A and a base plate 34B, which are two horizontally disposed plates. The right half of FIG. 6 is a sectional view that is perpendicular to the third direction and passes through the side surfaces of the first rack 22, and the left half thereof is a sectional view that passes through the side surfaces of the second rack 24. The first rack 22 is a component which supports the first arm 12 by one end thereof in the first direction and meshes with the pinion gear of the pinion 20 by the other end thereof so as to move the first arm 12 in the first direction as the pinion 20 rotates. As illustrated in the drawing, the first rack 22 is a plate-like member that has the longitudinal direction thereof in the first direction and the lateral direction thereof in the second direction. The end on the rotation axis AX side in the first direction has an elongated hole which is formed to open adjacently to the short side and extends in the first direction so as to enable the pinion 20 to pass through even when the first rack 22 moves toward the rotation axis AX. Therefore, the first rack 22 includes a base portion 22A which includes an end portion adjacent to the first arm 12 that is connected to the first arm 12, a first end portion 22B which is bifurcated from the base portion 22A and extends along the first direction, and a second end portion 22C which extends along the first direction to oppose the first end portion 22B, the first end portion 22B and the second end portion 22C being separated by the elongated hole where the pinion 20 is disposed, and sandwiching the pinion 20 in a plan view.

As illustrated in FIG. 1 and FIG. 6, the end portion of the base portion 22A that is adjacent to the first arm 12 is connected to the first arm 12 by using bolts. Therefore, the first arm 12 can be detached and a different arm can be attached according to the size, the shape, and the like of a transportation article. In addition, two rails which protrude in the third direction and are parallel to the first direction are formed on both ends of the base portion 22A in the second direction. Therefore, the first rack 22 can be guided to move in parallel to the first direction by forming two guide grooves that respectively engage with the two rails in the cover body 34A and by sandwiching the first rack 22 in the third direction between the cover body 34A and the base plate 34B. Further, as illustrated in FIG. 6, the base portion 22A has a total of ten through holes formed at positions that are symmetrical with respect to a plane which passes through the rotation axis AX, is perpendicular to the first direction, and passes through the rotation axis. Therefore, the weights of the components can be reduced without impairing balance.

As illustrated in FIG. 6, the second end portion 22C is a member that extends in the first direction and is separated from the first end portion 22B by the rotation axis AX. A rack gear 22C1 (hereinafter, the rack gear will be referred to as "the rack gear") for meshing with the pinion gear of the pinion 20 is formed on the side surface of the second end portion 22C that faces the rotation axis AX. The pitch and the tooth profile or the like of the rack gear 22C1 are designed to appropriately mesh with the pinion gear of the pinion 20. A projected portion 22C2 protruding in the second direction is formed on the side surface on the opposite side of the second end portion 22C, i.e., the side surface facing the second direction opposite from the rotation axis AX. The projected portion 22C2 comes in contact with a stopper of the base supporting the first rack 22 when the first rack 22 is moved away from the rotation axis AX in the first direction. Similarly, the projected portion 22C2 comes in contact with a stopper of the base plate 34B supporting the first rack 22 when the first rack 22 is moved toward the rotation axis AX in the first direction. Consequently, the positions at which the first arm 12 connected with the first rack 22 is farthest from and closest to the rotation axis AX can be defined by adjusting the formation position and the width of the projected portion 22C2. In the present embodiment, the interval between the first arm 12 and the second arm 14 is, for example, 185 mm at the minimum and 320 mm at the maximum.

Figure 7:
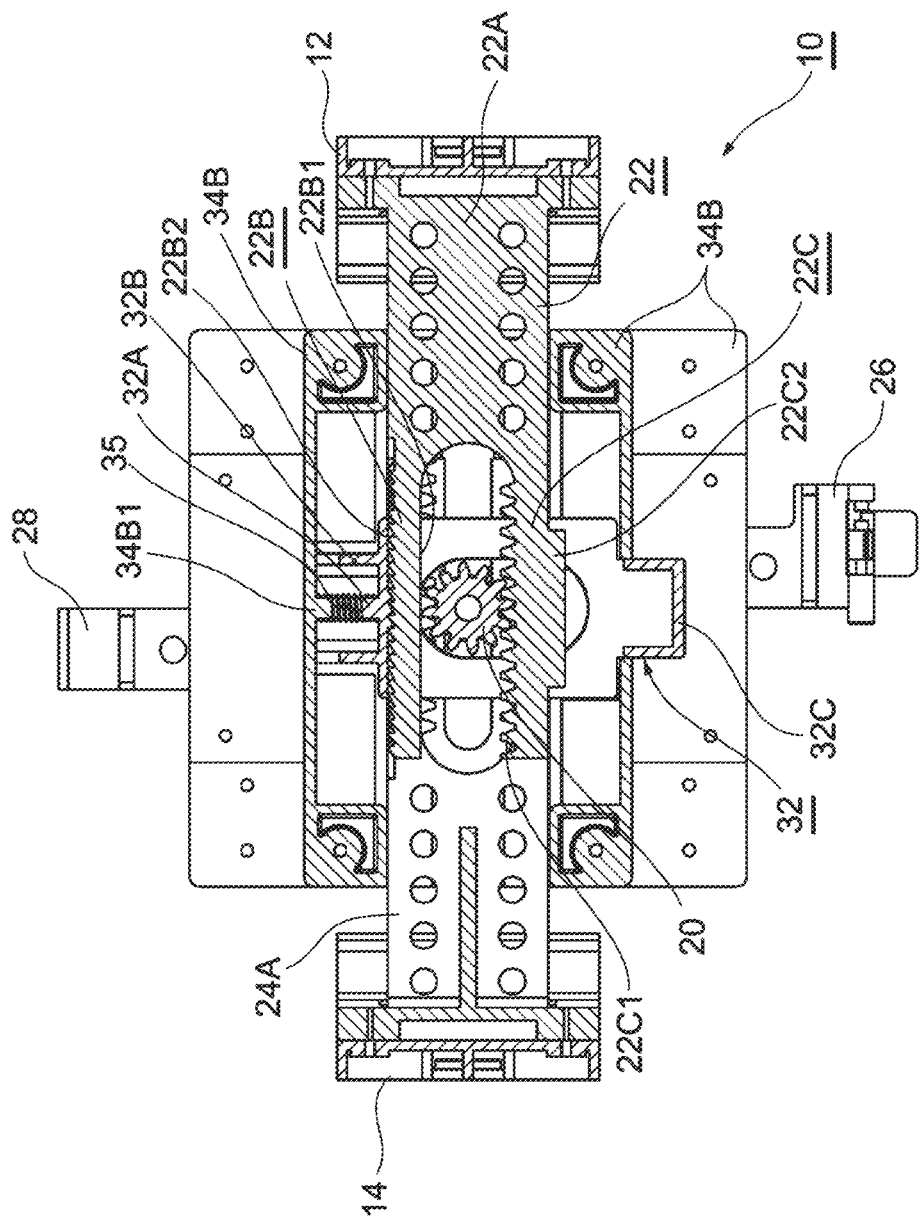
FIG. 7 is a sectional view passing through the side surface of the first rack 22.

Next, using FIG. 6 and FIG. 7, a description will be given of a latch mechanism for suppressing an increase in the interval between the first arm 12 and the second arm 14 during the conveyance of a transportation article. FIG. 7 is a sectional view which is perpendicular to the third direction and passes through the side surfaces of the first rack 22, the sectional view illustrating a state in which the movement of the first arm 12 is being suppressed by a ratchet 32, which is a locking means. Meanwhile, FIG. 6 illustrates a state in which the ratchet 32 has been released and the movement of the first arm 12 is not being suppressed.

As illustrated in FIG. 6 and FIG. 7, a plane perpendicular to the second direction is formed on a side surface 22B1 of the first end portion 22B of the first rack 22, the side surface 22B1 facing the rotation axis AX, such that the plane faces the pinion 20, being slightly separated from the pinion 20 so as not to come in contact with the pinion 20. Meanwhile, on the opposite side of the first end portion 22B, i.e., a side surface 22B2 facing the second direction opposite from the rotation axis AX, there is a sawtooth wave, i.e., in a plan view, inclined surfaces that are farther away from the rotation axis AX in the second direction as the inclined surfaces are closer to the first arm 12, and vertical surfaces which have a sufficiently large inclination as compared with the inclined surfaces or an angle of 90 degrees with respect to the first direction and which approach the rotation axis AX in the second direction as the vertical surfaces approach the first arm 12, the inclined surfaces and the vertical surfaces being periodically formed alternately along the first direction. Meanwhile, a sawtooth wave having vertical surfaces and inclined surfaces that mesh with the sawtooth wave formed on the side surface 22B2 of the first end portion 22B is formed on the ratchet 32, which will be described later. Accordingly, meshing these two sawtooth waves makes it possible to suppress the movement of the first arm 12 in the first direction. In particular, the vertical surfaces formed on the side surface 22B2 of the first end portion 22B are surfaces which are substantially perpendicular to the first direction and face in the direction in which the first arm 12 moves away from the rotation axis AX, so that it is possible to prevent the first arm 12 and the first rack 22 from moving away from the rotation axis AX by opposing these vertical surfaces and the vertical surfaces of the sawtooth wave formed on the ratchet 32. On the other hand, the inclined surfaces formed on the side surface 22B2 of the first end portion 22B are significantly inclined with respect to the first direction in which the first arm 12 moves. Hence, the configuration makes it difficult or impossible by the ratchet 32 for the first arm 12 and the first rack 22 to move away from the rotation axis AX, while making it easy to relatively move toward the rotation axis AX. The force for restraining the movement can be adjusted by adjusting the inclination angle of the vertical surfaces or the inclined surfaces, which constitute the sawtooth wave, with respect to the first direction. However, the restraining force in a direction for moving away from the rotation axis AX can be relatively increased and the restraining force for moving toward the rotation axis AX can be relatively decreased by setting the angle of the vertical surface with respect to the first direction to be larger than the angle of the inclined surfaces with respect to the first direction. For example, the compressive force of a spring 35 of the ratchet 32, which will be described later, the angle of the inclined surfaces, and the like are preferably set such that the first arm 12 can be moved toward the rotation axis AX although the first arm 12 cannot be manually moved away from the rotation axis AX in a state in which the ratchet 32 is in engagement with the first rack 22.

The ratchet 32 is a plate-like member inserted between the first rack 22 and the second rack 24. The ratchet 32 is a component for suppressing the movement of the first rack 22 and the first arm 12 connected thereto and the second rack 24 and the second arm 14 connected thereto in the first direction by engaging with the first rack 22 and the second rack 24.

The ratchet 32 has a through hole formed in the central portion thereof so as to avoid interference with the pinion 20 even when moving in the second direction. As illustrated in FIG. 6 and FIG. 7, a cylindrical projected portion 32A protruding in the second direction is formed at the central portion of a side surface facing the second direction. A cylindrical projected portion 34B1 facing the rotation axis AX is formed on the base plate 34B so as to oppose the projected portion 32A. The projected portion 32A and the projected portion 34B1 are formed coaxially and have the same diameter, so that the side surface of the ratchet 32 on which the projected portion 32A is formed can be pressed toward the rotation axis AX by inserting the spring 35 in a compressed state so as to engage with both.

Further, as illustrated in FIG. 6 and FIG. 7, a wall portion 32B is formed on the end portion of the ratchet 32 in the second direction, rising from the main surface of the ratchet 32 in the third direction to have the same height as the first rack 22. A sawtooth wave is formed on the side surface of the wall portion 32B that faces the rotation axis AX, the sawtooth wave being formed to have the same pitch as that of the sawtooth wave formed on the first end portion 22B of the first rack 22 so as to be engageable with the sawtooth wave formed on the first end portion 22B.

Further, a pressing portion 32C protruding in the second direction is formed on the other side surface of the ratchet 32 that faces the second direction. The pressing portion 32C protrudes from the surface of the base plate 34B and is exposed outside.

As a result of being provided with the latch mechanism described above, the ratchet 32 is normally pressed in the second direction by the spring 35. Consequently, the ratchet 32 is pressed against the first rack 22 in a state in which the vertical surfaces and the inclined surfaces formed on the wall portion 32B of the ratchet 32 oppose the vertical surfaces and the inclined surfaces, respectively, formed on the first rack 22. As a result, the movement of the first rack 22 in the first direction, especially the movement of the first arm 12 away from the rotation axis AX is suppressed. Therefore, it is possible to suppress the movement of the first arm 12 away from the rotation axis AX during the conveyance of a transportation article. On the other hand, the force for restraining the movement of the first arm 12 toward the rotation axis AX is relatively small, so that the first arm 12 can be manually moved toward a side surface of the transportation article even when the ratchet 32 is engaged with the first rack 22. Further, when the pressing portion 32C is pressed in the second direction by a force that exceeds the compressive force of the spring 35, the ratchet 32 moves in the second direction to be released from the engagement with the first rack 22, so that the first arm 12 can be moved away from the rotation axis AX to release the transportation article, or the like.

The second rack 24 has the same function as the first rack 22. In the following, therefore, duplicate descriptions will be omitted for parts that are reasonably understood by those skilled in the art, and descriptions will focus on parts that differ from the first rack 22.

The second rack 24 is a component that supports the second arm 14 by one end portion thereof in the first direction and meshes with the pinion gear of the pinion 20 by the other end portion thereof so as to move the second arm 14 in the first direction as the pinion 20 rotates. As with the first rack 22, the second rack 24 is supported by being inserted in the gap between the cover body 34A and the base plate 34B. However, the first rack 22 and the second rack 24 are inserted at different positions in the third direction so as to avoid mutual interference. Further, as with the first rack 22, the second rack 24 includes a base portion 24A which includes an end portion connected to the second arm 14, a first end portion 24B which is bifurcated from the base portion 24A and extends along the first direction so as to sandwich the pinion 20 in a plan view, and a second end portion 24C which extends along the first direction to oppose the first end portion 24B, being separated by the elongated hole where the pinion 20 is disposed. However, unlike the first rack 22, a rack gear 24B1 that meshes with the pinion gear of the pinion 20 is formed on the first end portion 24B, so that the direction in which the first arm 12 moves and the direction in which the second arm 14 moves as the pinion 20 rotates can be reversed, and the symmetry with respect to a plane which is parallel to the first direction and passes through the rotation axis AX can be improved.

Further, on the surface of the first end portion 24B that faces opposite from the rotation axis AX, a sawtooth wave having vertical surfaces and inclined surfaces provided periodically, as with the first end portion 22B, is formed on a side surface 24B2. However, as illustrated in FIG. 6, in order to prevent the second arm 14 and the second rack 24 from moving away from the rotation axis AX, the surfaces are formed to have vertical surfaces which face a direction opposite from the sawtooth wave formed on the first rack 22, i.e., which are substantially perpendicular to the first direction and face a direction in which the second arm 14 moves away from the rotation axis AX, and inclined surfaces that connect adjacent vertical surfaces.

As illustrated in the drawing, a wall portion 32D is formed on an end portion of the ratchet 32 in the second direction such that the wall portion 32D extends downward in the third direction from the main surface of the ratchet 32 to have the same height as the second rack 24 so as to mesh with the sawtooth wave formed on the side surface 24B2 of the second rack 24, and a sawtooth wave having an inclination angle and a pitch which match and mesh with the sawtooth wave formed on the side surface 24B2 of the second rack 24 is formed on the side surface of the wall portion that faces the rotation axis AX.

Further, as with the first rack 22, a projected portion 24C1 protruding in the second direction is formed on the second end portion 24C to define the positions at which the second arm 14 connected with the second rack 24 is farthest from and closest to the rotation axis AX.

As a result of the configuration described above, as with the first rack 22, the ratchet 32 applies pressure in the second direction perpendicular to the first direction in which the second rack 24 moves, thus making it possible to enhance the restraining force for suppressing the movement of the second rack 24 in the first direction and especially the movement of the second arm 14 away from the rotation axis AX. This makes it possible to achieve a configuration in which the interval between the first arm 12 and the second arm 14 is less likely to widen and more likely to narrow.

The first rack 22 and the second rack 24 are disposed at different positions in the third direction, so that the rack gear 22C1 and the rack gear 24B1 are accordingly disposed at different positions in the third direction. Consequently, as illustrated in FIG. 5A and FIG. 5B, a portion 20A where the gear of the pinion 20 is formed has a predetermined thickness in the third direction so as to mesh with both. However, the thickness is not limited to this, and the thickness of the portion 20A in which the gear of the pinion 20 is formed may be reduced by forming the rack gear 22C1 and the rack gear 24B1 at the same position in the third direction. Further, the portion 20A where the gear is formed may be separated into two portions in the third direction, and the gear may be formed in each of the portions.

Further, the pinion 20 has a shaft portion 20B protruding in the third direction. Thus, a configuration can be achieved in which the pinion 20 can be automatically rotated by connecting the shaft portion 20B to a motor or the like, or the pinion 20 can be manually rotated by connecting the shaft portion 20B to a handle. As illustrated in FIG. 4, the elongated hole is formed in the first rack 22 such that the area on the upper surface side is smaller than the area on the lower surface side so as to further suppress the entry of dust and the like into the surroundings of the pinion 20 and to avoid interference with the pinion 20.

Subsequently, a description will be given of the width adjusting mechanism that adjusts the interval between the third arm 16 and the fourth arm 18. However, the description of the parts that are understood by those skilled in the art to exhibit the same functions as the first arm 12 and the second arm 14 will be omitted or simplified, and the description will be focused on parts that are different from the first arm 12 and the second arm 14. In the present embodiment, the first arm 12 and the second arm 14 and the third arm 16 and the fourth arm 18 are not interlocked and can be moved independently of each other. However, the present invention is not limited to this configuration, and the arms may alternatively be configured such that all the arms operate in conjunction with each other by engaging all the arms with a plurality of components that operate in the same manner or in conjunction with each other.

The third arm 16 and the fourth arm 18 are used to assist the first arm 12 and the second arm 14 to grip a transportation article so as to especially suppress the movement of the transportation article in the second direction. For this reason, as illustrated in FIG. 1, the third arm 16 and the fourth arm 18 have the contact surfaces that come in contact with or face, with a slight gap, the side surfaces of the transportation article that face the second direction.

Figure 8:
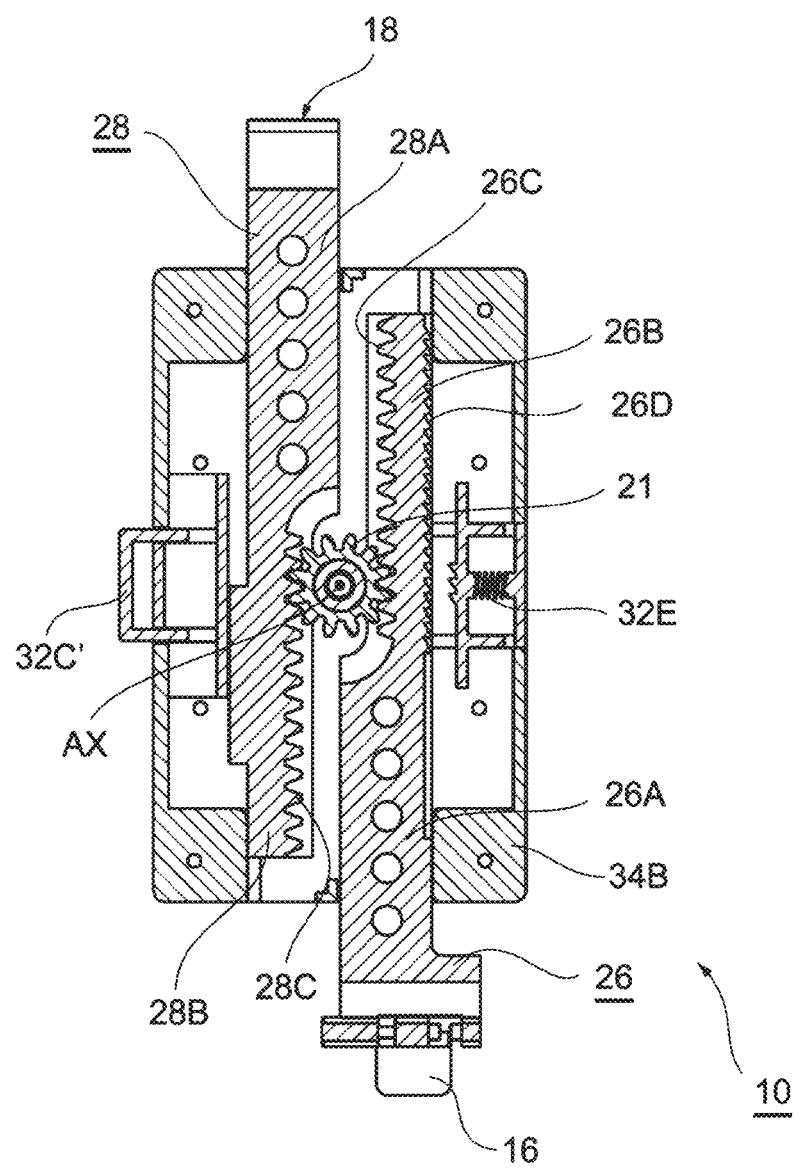
FIG. 8 is a sectional view taken on D-D in FIG. 2.

FIG. 8 is a sectional view which is perpendicular to the third direction and passes through the side surfaces of the third rack 26 connected to the third arm 16 and the fourth rack 28 connected to the fourth arm 18 (the D-D section in FIG. 2). As illustrated in FIG. 1, the third rack 26 and the fourth rack 28 are supported by being inserted in the gap between the base plate 34B and the base plate 34C, which are two plates horizontally disposed.

The third rack 26 is a component that supports the third arm 16 by one end portion thereof in the second direction and meshes with the pinion gear of the pinion 21 by the other end portion thereof so as to move the third arm 16 in the second direction as the pinion 21 rotates. Similarly, the fourth rack 28 is a component that supports the fourth arm 18 by one end portion thereof in the second direction and meshes with the pinion gear of the pinion 21 by the other end portion thereof so as to move the fourth arm 18 in the second direction as the pinion 21 rotates. Here, the pinion 21 is rotatably supported through the intermediary of the shaft of the pinion 20, a bearing, and the like, so that the pinion 21 can rotate about the rotation axis AX independently of the pinion 20. As illustrated in the drawings, the third rack 26 is a plate-like member having a longitudinal direction in the first direction and a lateral direction in the second direction, and has a base portion 26A including an end portion adjacent to the third arm 16, which is connected to the third arm 16, and the other end portion 26B. A rack gear 26C for meshing with the pinion 21 is formed on the side surface of the other end portion 26B which faces the first direction and opposes the rotation axis AX, and a sawtooth wave for meshing with a sawtooth blade formed on a wall portion 32E of the ratchet 32 is formed on the opposite side surface. Similarly, the fourth rack 28 has a base portion 28A including an end portion adjacent to the fourth arm 18, which is connected to the fourth arm 18, and the other end portion 28B. A rack gear 28C for meshing with the pinion 21 is formed on the side surface of the other end portion 28B which faces the first direction and opposes the rotation axis AX. Although no sawtooth wave for meshing with the ratchet 32 is formed on the fourth rack 28, when the movement of the third rack 26 is suppressed, the pinion 21 does not rotate and stays still, and the movement of the fourth rack 28 is also suppressed, so that it is not necessarily required to provide both racks with a configuration for engaging the ratchet 32. Further, the third rack 26 is disposed in one region obtained by dividing by a plane which passes through the rotation axis AX and is parallel to the second direction, and the fourth rack 28 is disposed in the other region, thus enabling both of them to be disposed at the same position in the third direction. Consequently, the thickness of the pinion 21 in the third direction can be reduced, and the symmetry with respect to the plane can be enhanced, making it possible to bring the center of gravity of the gripping mechanism 10 closer to the rotation axis AX.

The ratchet 32 is provided with a mechanism for converting the movement in the second direction by the pressure applied by the pressing portion 32C into a movement in the first direction thereby to move the wall portion 32E in the first direction. For example, by providing a pin protruding in the third direction and a plate-like member which is restricted in movement in the second direction and movable only in the first direction, and by forming, in the plate-like member, a through hole which engages with the pin and extends in a direction at an angle with respect to the first direction and the second direction, the plate-like member can be moved in the first direction as the pin moves in the second direction. The present embodiment achieves such a motion by disposing the plate-like member below the third rack 26 and the fourth rack 28 in the third direction, and by providing the wall portion 32E so as to protrude upward in the third direction from the plate-like member. This makes it possible to also achieve a configuration in which the distance between the third arm 16 and the fourth arm 18 is less likely to widen and more likely to narrow. However, the configuration is not limited to this, and alternatively, a ratchet may be separately provided for each direction of movement, or no ratchet may be provided.

The gripping mechanism 10 having the configuration described above makes it possible to change the interval between the first arm 12 and the second arm 14 by the rotation of the pinion 20 while maintaining the distance between the first arm 12 and the rotation axis AX and the distance between the second arm 14 and the rotation axis AX to remain equal. Consequently, transportation articles having various sizes can be stably gripped while maintaining the center of gravity of the gripping mechanism 10 in the vicinity of the rotation axis AX without causing a significant shift of the center of gravity of the gripping mechanism 10. As the mechanism for moving the arms, a different mechanism that converts a rotational motion into a linear motion other than a rack-pinion mechanism may be applied.

Figure 9:
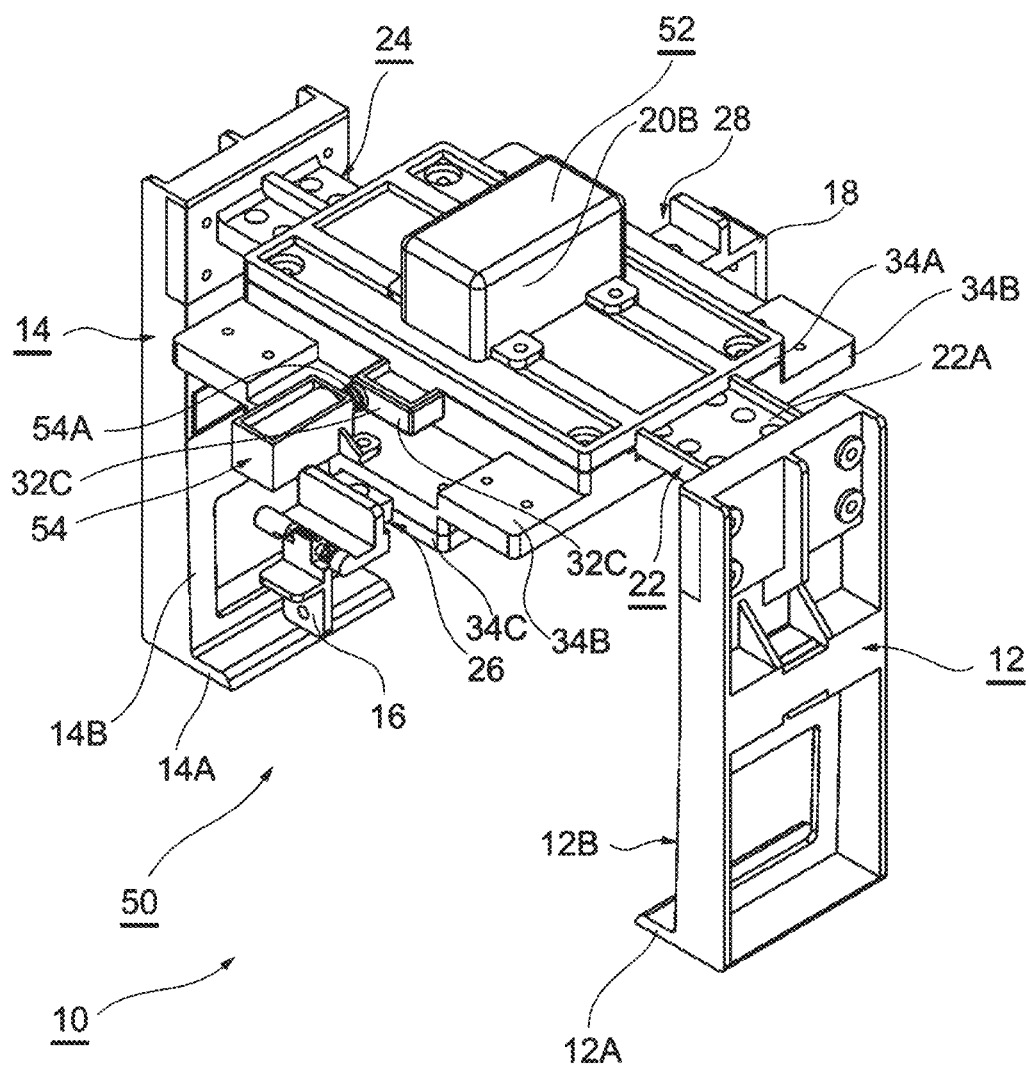
FIG. 9 is a perspective view of a gripping mechanism 50.
Figure 10:
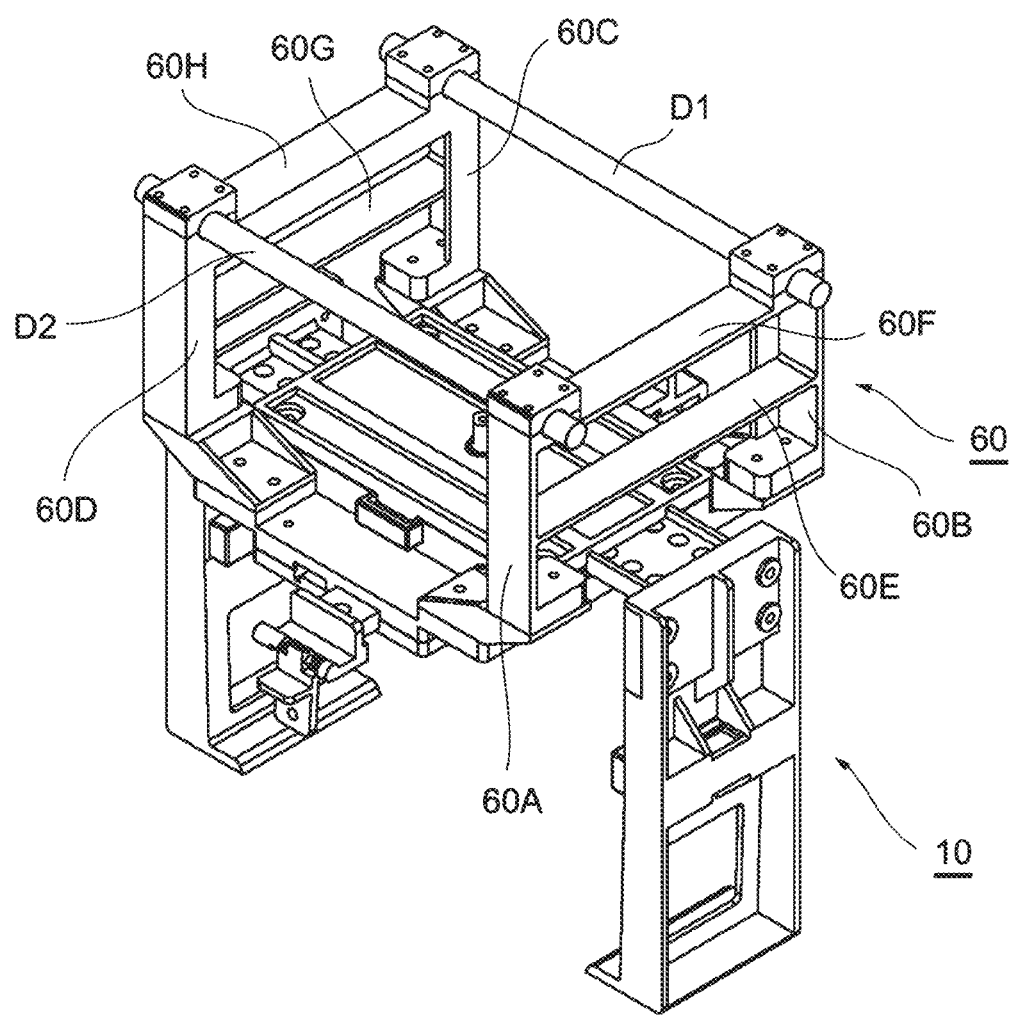
FIG. 10 is a perspective view of the gripping mechanism 10 to which a mounting frame 60 has been attached.
Figure 11:
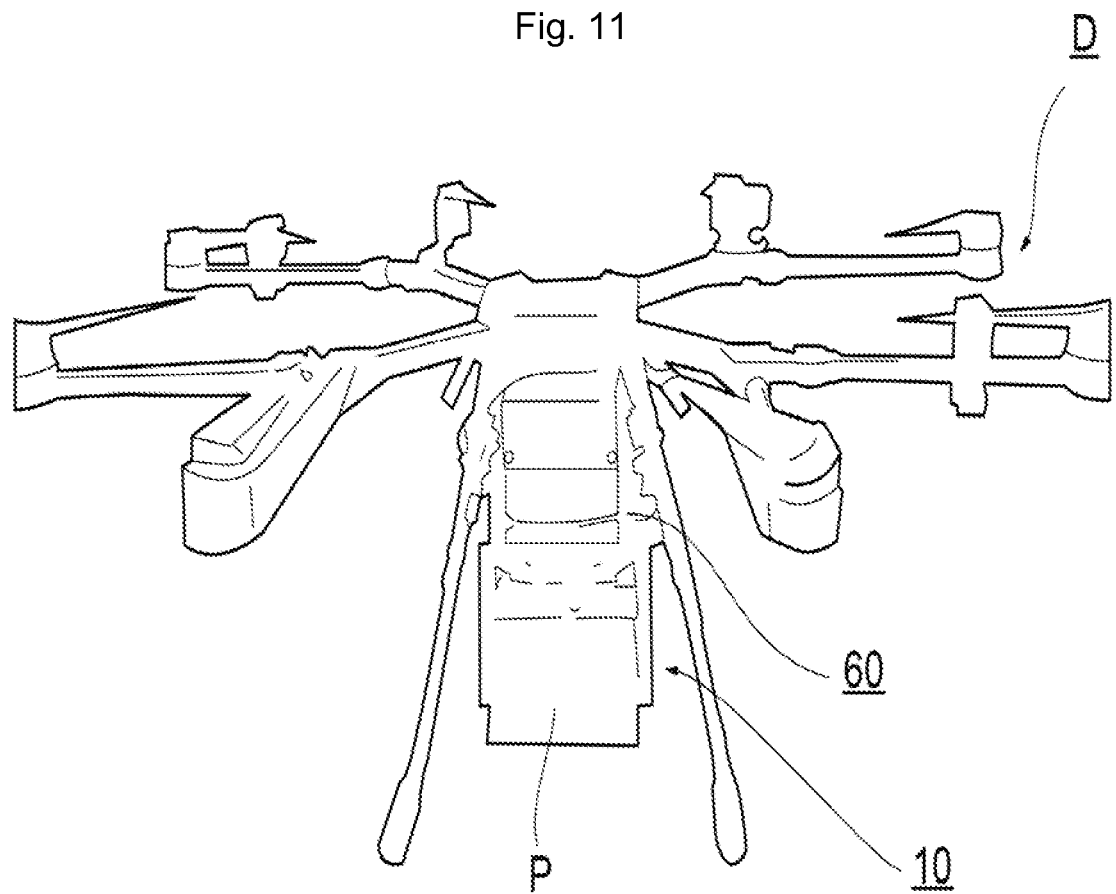
FIG. 11 is a diagram illustrating a state in which the gripping mechanism 10 has been attached to a drone D.

FIG. 9 illustrates a gripping mechanism 50 that includes a motor 52 for rotatively driving the pinion 20. However, the rest is the same configuration as that of the gripping mechanism 10, so that the same reference signs will be assigned and detailed descriptions will be omitted. FIG. 10 illustrates a mounting frame 60 for attaching the gripping mechanism 10 and the gripping mechanism 50 to a drone, which is an example of an unmanned aerial vehicle. FIG. 11 illustrates a state in which the gripping mechanism 10 gripping a transportation article P has been attached to a drone D by using the mounting frame 60.

As illustrated in FIG. 9, the gripping mechanism 50 has the motor 52, which is connected to the shaft portion 20B of the pinion 20, mounted on the cover body 34A. Further, a plunger 54 for pressing the pressing portion 32C of the ratchet 32 is installed on the base plate 34B. Further, the gripping mechanism 50 is configured to, in response to a control instruction from the drone, release the lock by the ratchet 32 by pressing the pressing portion 32C by a pin 54A of the plunger 54 and to drive the motor 52 to rotatively drive the shaft portion 20B and the pinion 20, thereby moving the first arm 12 and the second arm 14 away from the rotation axis AX. The motor 52 includes, for example, a servomotor, an angle sensor for detecting a rotational angle, a motor driver, a control board on which an interface circuit for transmitting and receiving signals to and from the drone, and the like are mounted. However, the motor 52 is not limited to a servomotor and may alternatively use a stepping motor, a DC motor, or the like. Further, a configuration may be adopted in which a button for driving the motor 52 is separately provided, so that the motor 52 is driven also by a person who receives the transportation article by pressing the button. For example, the configuration may be such that the button is provided at a position to which the pressing portion 32C is moved by being pressed (e.g., the side surface of the cover body 34A that opposes the inner wall of the pressing portion 32C), and the first arm 12 and the second arm 14 spread only when the lock by the ratchet 32 is released.

FIG. 10 is a perspective view illustrating a state in which the mounting frame 60 has been attached to frames D1 and D2 of the drone D. The shape and the structure of the mounting frame can be changed as necessary according to the type of an unmanned aerial vehicle used. In the present embodiment, the drone D has the columnar frames like the frames D1 and D2, so that the mounting frame 60 is attached to the drone D by fixing the frames D1 and D2 by vertically bolting at four places. Here, in the mounting frame 60, four supports 60A to 60D extending in the third direction and beams 60E to 60H connecting the supports are formed such that the mounting frame 60 is symmetrical with respect to a plane which passes through the rotation axis AX and is parallel to the first direction, and is also symmetrical with respect to a plane which passes through the rotation axis AX and is parallel to the second direction. Further, the four positions of installation to the drone D and the position of installation of the gripping mechanism 10 to the base plate 34B are also symmetrical with respect to the two planes. Consequently, even after the mounting frame 60 is attached, the position of the center of gravity of the gripping mechanism 10 or the gripping mechanism 50 does not significantly deviate from the rotation axis AX.

FIG. 11 illustrates a state in which the gripping mechanism 10 gripping the transportation article P has been attached to the drone D by using the aforesaid mounting frame 60. By attaching the gripping mechanism 10 such that the center of gravity of the drone D passes through the rotation axis AX, i.e., the vertical line passing through the center of gravity of the drone D coincides with the rotation axis AX, in a stationary state, it is possible to suppress significant disturbance of the center of gravity. In particular, the stability of flight of the drone D can be improved by setting the position at which the drone D is installed by a mounting fixture to be a position that is symmetrical with respect to a plane which passes through the center of gravity of the drone D and is parallel to the forward direction or a plane which passes through the center of gravity of the drone D and is parallel to the lateral direction. It should be noted that coincidence is not limited to the case of exact coincidence but includes the case of coincidence within a reasonable range. For example, if the drone D has a plurality of frames that are rotationally symmetrical with respect to a predetermined central axis and propellers attached to the frames, then the case where the central axis and the rotation axis AX substantially coincide within a reasonable range is included.

Figure 12:
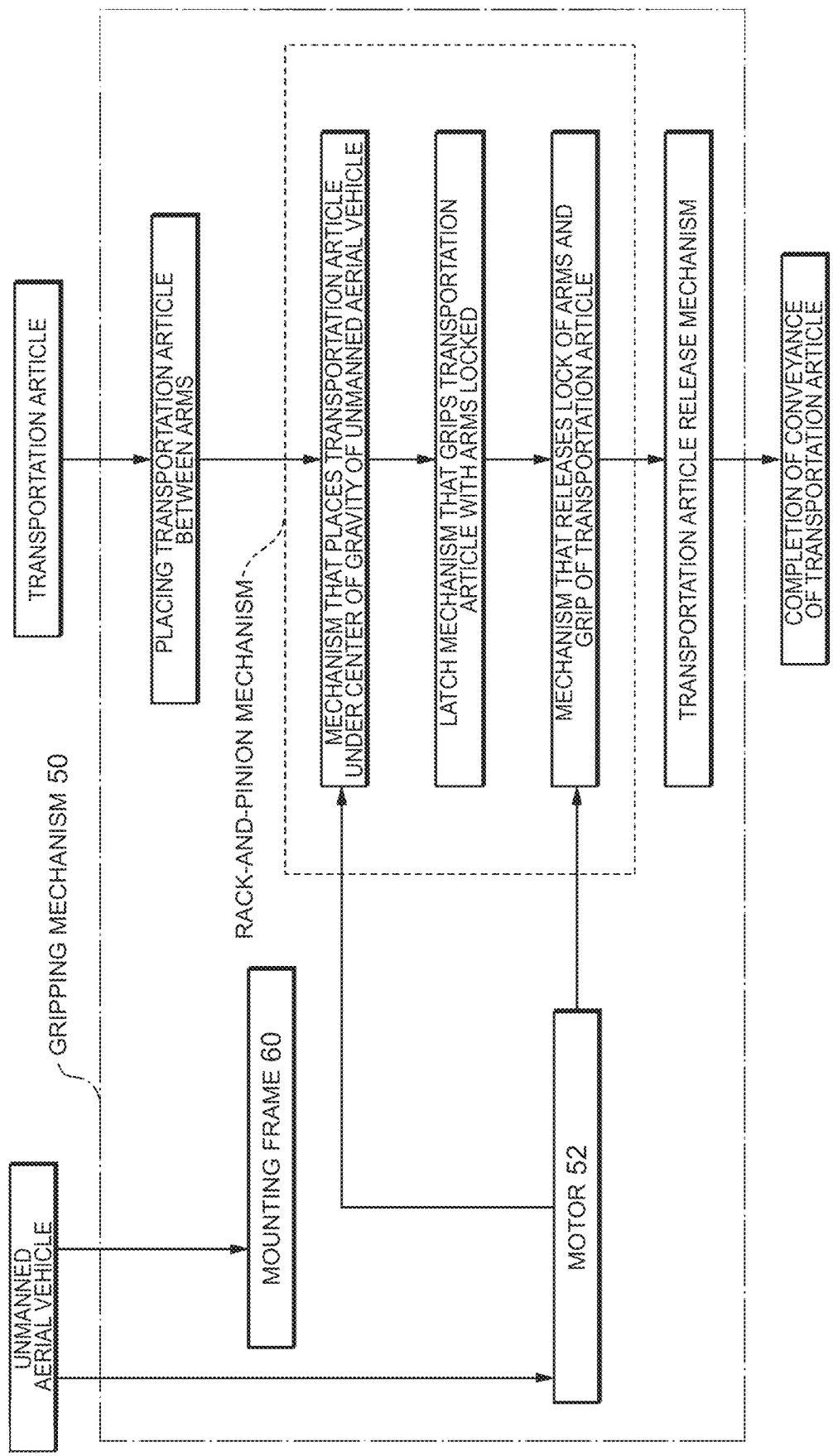
FIG. 12 is a functional block diagram of the gripping mechanism 50.
Figure 13:
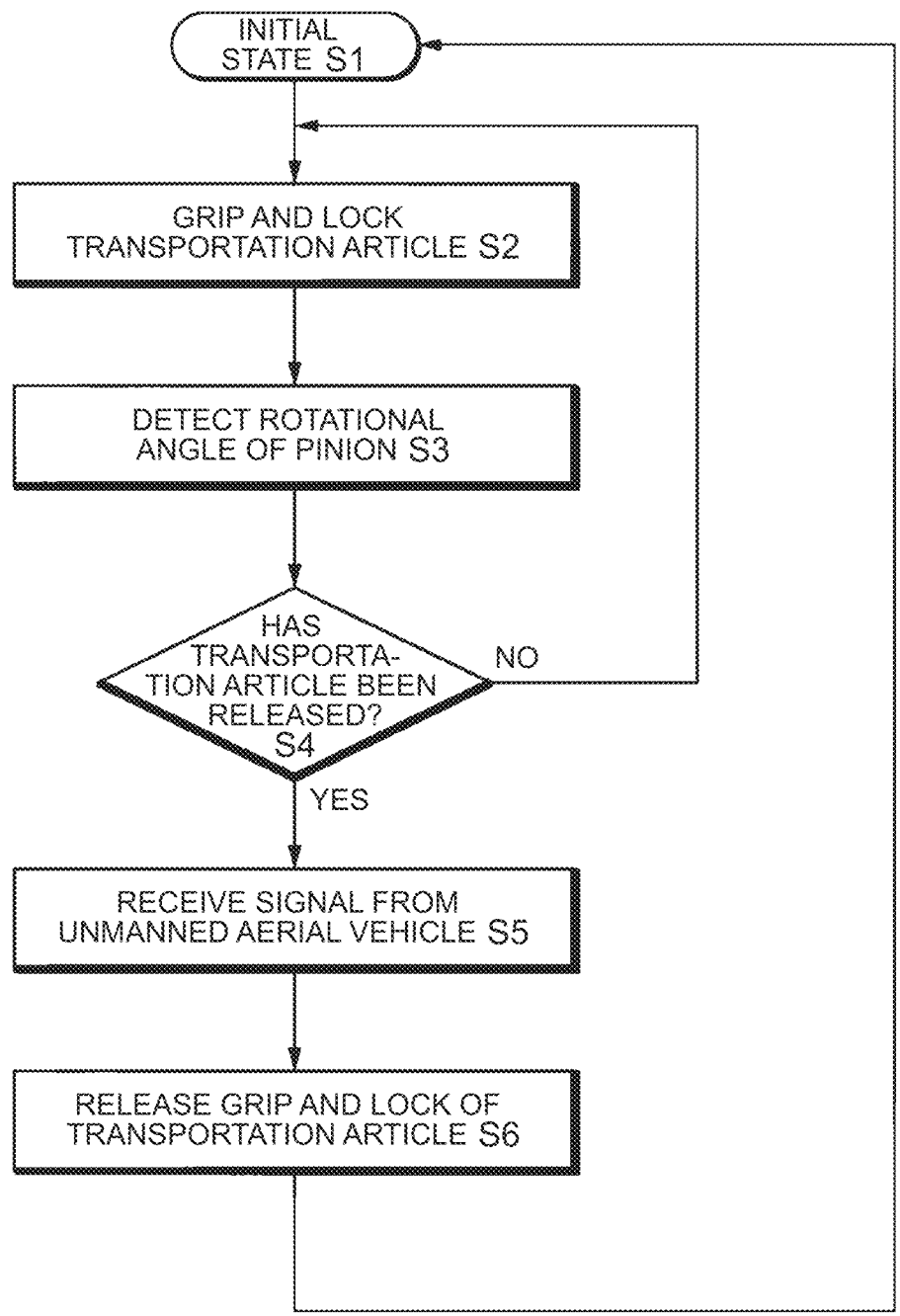
FIG. 13 is an operation flowchart of the gripping mechanism 50.

FIG. 12 illustrates a functional block diagram of the gripping mechanism 50 in a transportation article conveyance device having the gripping mechanism 50 attached to an unmanned aerial vehicle represented by a drone. FIG. 13 illustrates an operation flowchart of the gripping mechanism 50 when a transportation article is conveyed using the transportation article conveyance device.

First, in step S1, the first arm 12, the second arm 14, the third arm 16, and the fourth arm 18 are opened to the maximum, and a transportation article is placed among these arms. For this step, an operator could manually release the ratchet 32 and open the arms, but as described above, a configuration may alternatively be adopted in which a button for driving the motor 52 is installed on the gripping mechanism 50 and the operator depresses the button to drive the motor 52, thereby opening the first arm 12 and the second arm 14 to the maximum.

Subsequently, in step S2, the transportation article is gripped and locked by the ratchet 32. At this time, even if the transportation article is disposed with the center of the transportation article displaced from the rotation axis AX in step S1, the transportation article is moved such that the center of the transportation article is set at substantially the same position as the rotation axis AX with respect to the first direction by being sandwiched by the first arm 12 and the second arm 14, which move while maintaining equal distances relative to the rotation axis AX. Similarly, the third arm 16 and the fourth arm 18 perform centering also with respect to the second direction. This step may be performed manually by an operator moving the first arm 12 or the second arm 14 toward the rotation axis AX in a state in which the ratchet 32 is in engagement with the first rack 22 and the like, or may be performed using a button for driving the motor 52 or according to an instruction from the drone D. By the time the gripping is completed, the ratchet 32 is in engagement with the first rack 22 and the like by the latch mechanism, so that fixing (locking) of the first rack 22 and the first arm 12 and the like connected to the first rack 22 is completed. Thereafter, the drone D departs for a destination under automatic piloting.

As illustrated in step S3, the rotational angle of the pinion 20 is detected by a rotational angle sensor of the motor 52. A configuration may be adopted in which, for example, detection results are transmitted to the drone D at every predetermined period so as to make it possible to detect an increase in the interval between the first arm 12 and the second arm 14 while conveying the transportation article.

When the drone D arrives at the destination, the release of the transportation article is permitted in the determination step of step S4, and the process proceeds to step S5 to receive an instruction from the drone D.

Then, in step S6, based on an instruction from the drone D, the grip and lock of the transportation article is released, thus releasing the transportation article. More specifically, according to the instruction from the drone D, the pin 54A of the plunger 54 depresses the pressing portion 32C to release the lock by the ratchet 32, and the motor 52 is driven to rotatively drive the shaft portion 20B and the pinion 20 thereby to move the first arm 12 and the second arm 14 away from the rotation axis AX.

At this time, the contact surface 12B of the first arm 12 and the contact surface 14B of the second arm 14 separate from the side surfaces of the transportation article, whereas the pressing components 12C1 and 14C1 are relatively moved by the springs 12C2 and 14C2 to protrude from the contact surfaces 12B and 14B. Consequently, the pressing components 12C1 and 14C1 continue to press the transportation article until the springs 12C2 and 14C2 restore the natural lengths. For example, if the center of the transportation article is no longer positioned on the rotation axis AX due to some reason such as the influence of a sudden wind during conveyance, then the transportation article will inconveniently tilt toward a heavier side when the first arm 12 and the like are separated. Therefore, a possibility arises that even when the first arm 12 and the second arm 14 are opened to the maximum, the transportation article will not be separated from the gripping mechanism 50 and cannot be released, remaining in contact with the first arm 12 and the like. The same risk arises when the center of gravity of the transportation article does not exist on the rotation axis AX. However, in the gripping mechanism 50 according to the present embodiment, the pressing components 12C1 and 14C1 press the transportation article toward the center, at which the rotation axis AX exists, to forcibly perform centering, thus making it possible to suppress the phenomenon in which the transportation article tilts when released.

Taking the steps described above makes it possible to stably convey and unattendedly release a transportation article. The third arm 16 and the fourth arm 18 do not support the bottom surface of the transportation article, and therefore do not interfere with the release of the transportation article from the gripping mechanism 50.

A gripping mechanism, such as the gripping mechanism 10, may be attached to, for example, a self-driving vehicle which unattendedly moves in a factory and conveys luggage, components, and the like, in addition to being attached to an unmanned aerial vehicle. Further, the applications are not limited to luggage home delivery and the like, and may include, for example, the conveyance of relief supplies and the like to a dangerous zone or a disaster area where there is a possibility of harm to human bodies.

Modification Example 1

Figure 14:
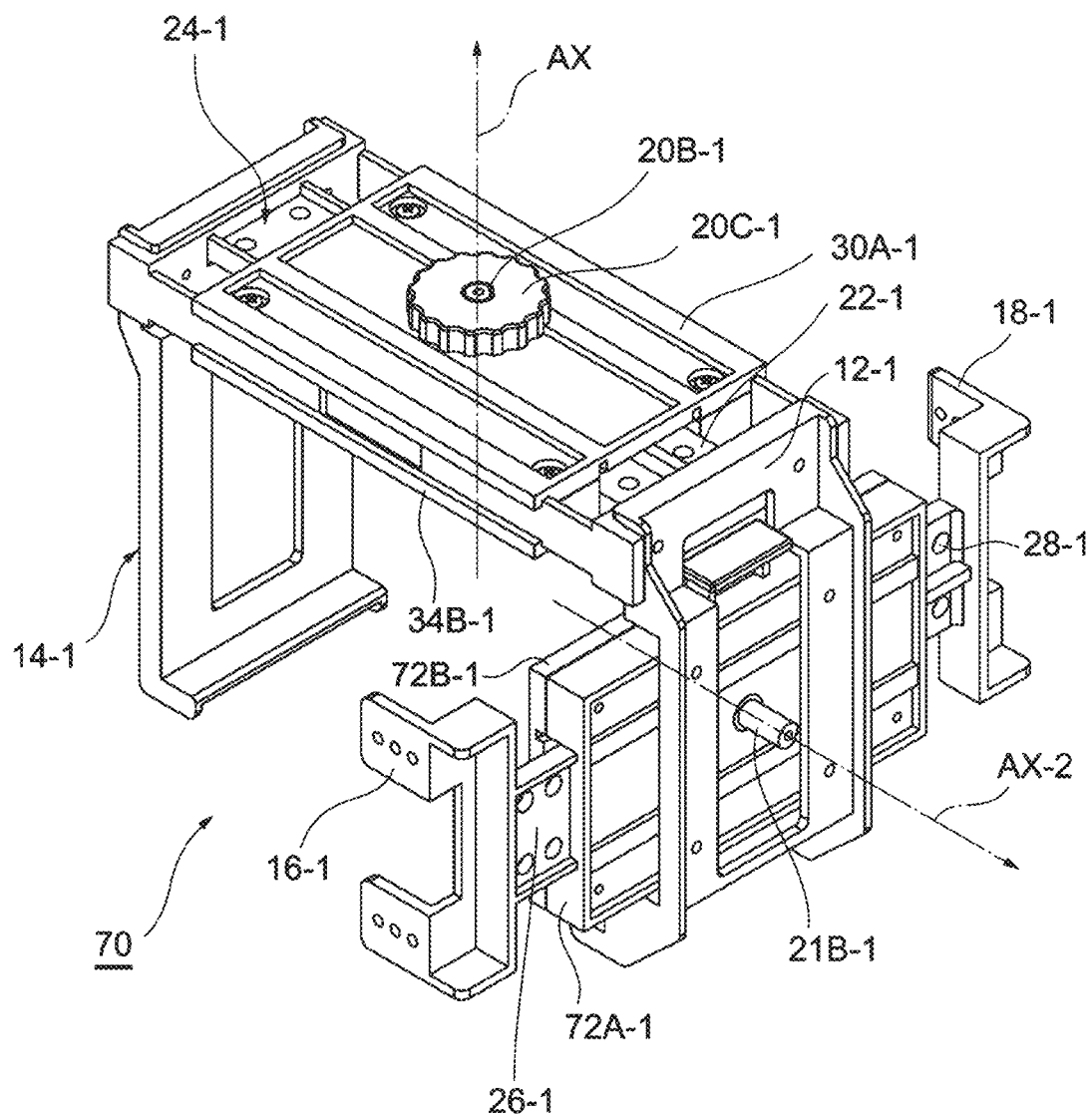
FIG. 14 is a perspective view of a gripping mechanism 70.

FIG. 14 is a perspective view of a gripping mechanism 70 according to a modification example of the gripping mechanism 10 illustrated in the first embodiment. However, regarding constituent elements that exhibit the same or similar functions, some of the constituent elements will be assigned common reference signs or similar designations, and detailed descriptions will be omitted.

The gripping mechanism 70 includes a third rack 26-1 and a fourth rack 28-1 attached to a first arm 12-1. These third rack 26-1 and the fourth rack 28-1 have rack gears meshing with a pinion (not illustrated) that rotates about a rotation axis AX-2. The rotation axis AX-2 is parallel to the first direction and intersects perpendicularly with a rotation axis AX. Hence, while maintaining the distance between the rotation axis AX-2 and the third arm 16 and the distance between the rotation axis AX-2 and the fourth arm 18 to remain equal, these arms can be moved in the second direction by rotating the pinion.

Further, a handle 20C-1 attached to a shaft portion 20B-1 of the pinion is included. Therefore, an operator can easily open and close the first arm 12-1 and the like by rotating the handle 20C-1. Similarly, a shaft portion 21B-1 of a pinion 21-1 may be provided with a handle in the same manner.

In order to improve the symmetry with respect to a plane which is perpendicular to the rotation axis AX-2 and passes through the rotation axis AX, the second arm 14-1 may have the same structure as the first arm 12-1, and a fifth arm and a sixth arm that move in the second direction to grip a transportation article, as with the third arm 16-1 and the fourth arm 18-1, and a width adjusting mechanism for these may be included. Further, a configuration may be adopted in which a motor connected to the shaft portion 20B-1 is provided under the handle 20C-1, so that the pinion can be rotated not only by hand but also by the motor.

Modification Example 2

Figure 15:
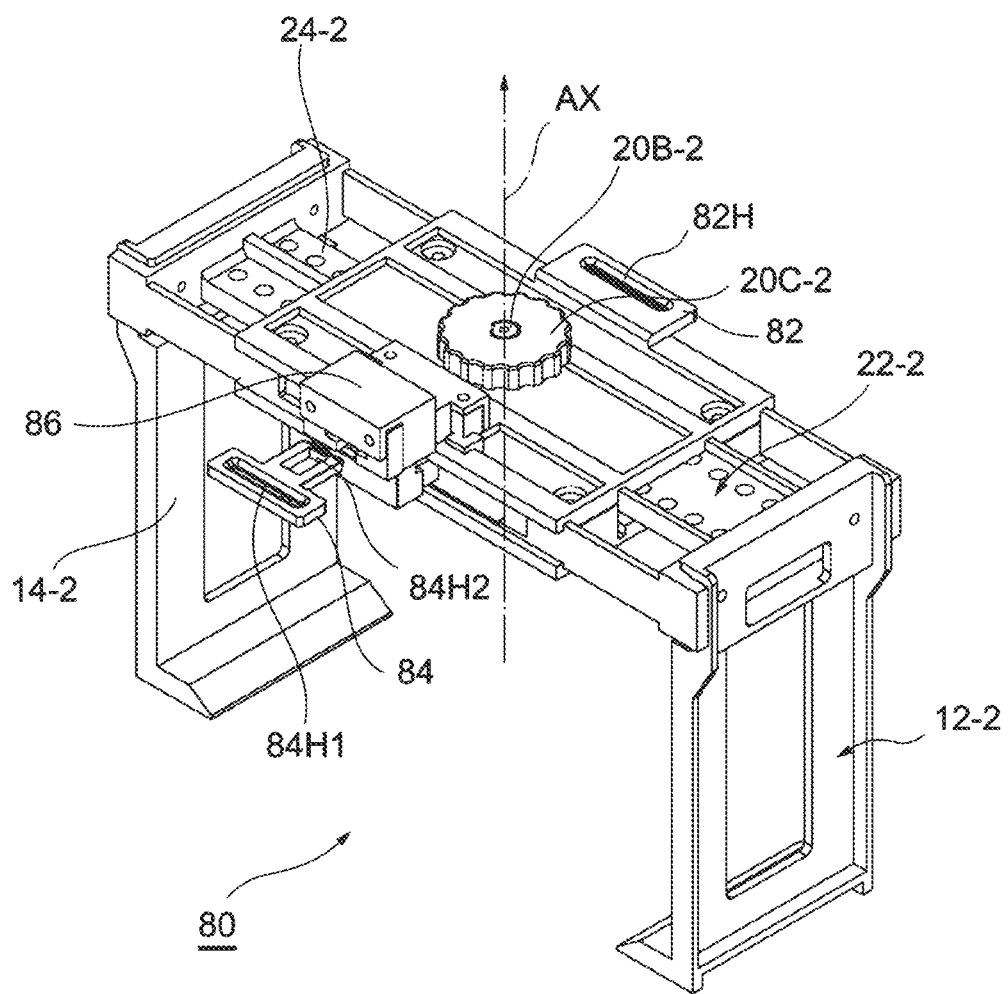
FIG. 15 is a perspective view of a gripping mechanism 80.

FIG. 15 is a perspective view of a gripping mechanism 80 according to a modification example of the gripping mechanism 10 illustrated in the first embodiment. However, regarding constituent elements that exhibit the same or similar functions, some of the constituent elements will be assigned common reference signs or similar designations, and detailed descriptions will be omitted.

The gripping mechanism 80 does not have a third arm and a fourth arm, but instead, uses a belt (not illustrated) to be capable of supporting the bottom surface of a transportation article. The length of the belt can be changed according to the size of a transportation article. The bottom surface of the transportation article can be supported using the belt, thus enabling the transportation article to be held more stably. In addition, even if a transportation article is not rectangular parallelepiped-shaped, the transportation article can be held according to the shape thereof.

The gripping mechanism 80 includes belt holders 82 and 84 for holding a belt, and a latch mechanism 86 for attaching the belt holder 84 to the gripping mechanism 80. The belt holder 82 has a hole 82H formed to have a width that matches the width of the belt, so that one end of the belt can be passed through the hole 82H and fixed. Similarly, the other end of the belt can be passed through a hole 84H1, which is formed in the belt holder 84, and fixed. The latch mechanism 86 includes therein a first pin to which a force directed downward in the third direction is applied by a spring and a second pin to which a force directed outward in the first direction is applied by a spring. The first pin has a sloped surface formed to facilitate insertion of the belt holder 84. Therefore, when the distal end of the belt holder 84 is inserted into the latch mechanism 86, a sloped surface at the distal end of the belt holder 84 comes in contact with the sloped surface of the first pin, causing the first pin to be pushed upward in the third direction against the elastic force of the spring. Further, when the belt holder 84 is inserted, the first pin that has been pushed up in the third direction is moved downward in the third direction by the spring and inserted into a hole 84H2. At this time, the distal end of the first pin is configured to be pressed outward in the first direction by the second pin. This enables the belt holder 84 to be attached to the gripping mechanism 80. To detach the belt holder 84, the belt holder 84 is further inserted to push the second pin down, and in this state, the belt holder 84 is moved downward so as to disengage the first pin.

Also in the gripping mechanism 70 or 80 having the configuration described above, while maintaining the distance between the first arm and the rotation axis AX and the distance between the second arm and the rotation axis AX to remain equal, the interval between the both can be changed by rotating the handle and the pinion which rotates integrally with the handle. Consequently, transportation articles of various sizes can be stably gripped while maintaining the center of gravity of the gripping mechanism 10 in the vicinity of the rotation axis AX without causing a significant shift in the center of gravity thereof.

The first arm and the second arm may alternatively be configured to move upward. In such a configuration, transportation articles having different heights can be appropriately held in the direction of height by opposing the first arm and the second arm, and the upper surface of a transportation article close to the base plate 34C.

REFERENCE SIGNS LIST

AX . . . rotation axis; 10 . . . gripping mechanism; 12 . . . first arm; 14 . . . second arm; 16 . . . third arm; 18 . . . fourth arm; 20 . . . pinion; 20C . . . handle; 21 . . . pinion; 22 . . . first rack; 24 . . . second rack; 26 . . . third rack; 28 . . . fourth rack; 32 . . . ratchet; 34A . . . cover body; 34B . . . base plate; 34C . . . base plate; 50 . . . gripping mechanism; 52 . . . motor; 54 . . . plunger; 60 . . . mounting frame; 60 . . . mounting frame; 70 . . . gripping mechanism; 80 . . . gripping mechanism; 82 . . . belt holder; 84 . . . belt holder; and 86 . . . latch mechanism.

What is claimed is:

1. A gripping mechanism attached to a moving body so as to grip and convey a transportation article, comprising:
    a rotating body provided so as to be rotatable about a rotation axis, the rotating body including a pinion on which a pinion gear is formed;
    a first arm and a second arm disposed so as to be separated from the rotation axis by the same distance, with the rotation axis as a center, in order to grip the transportation article; and
    a width adjusting mechanism which engages with the rotating body, the first arm and the second arm and which is configured such that the first arm and the second arm move toward the rotation axis in the case where the rotating body rotates about the rotation axis in a predetermined direction, and the first arm and the second arm move away from the rotation axis in the case where the rotating body rotates about the rotation axis in a direction opposite from the predetermined direction, the width adjusting mechanism including a first rack on which a first rack gear meshing with the pinion gear is formed and which is connected with the first arm, and a second rack on which a second rack gear meshing with the pinion gear is formed and which is connected with the second arm;
    a locking means for suppressing movement of the first arm and the second arm away from the rotation axis, the locking means including: a first engagement portion that engages with the first rack, a second engagement portion that engages with the second rack, and an elastic member for pressing the first rack and the second rack in a direction perpendicular to moving directions of the first arm and the second arm by the first engagement portion and the second engagement portion,
    wherein a first vertical surface, which faces a direction in which the first arm moves toward the rotation axis, is formed on the first engagement portion,
    a second vertical surface, which faces a direction in which the second arm moves toward the rotation axis, is formed on the second engagement portion,
    a plurality of surfaces that face a direction in which the first arm moves away from the rotation axis to oppose the first vertical surface are periodically formed on the first rack, and
    a plurality of surfaces that face a direction in which the second arm moves away from the rotation axis to oppose the second vertical surface are periodically formed on the second rack.

2. The gripping mechanism according to claim 1, further including a motor for rotating the rotating body about the rotation axis.

3. The gripping mechanism according to claim 1, further including: a first support which is attached to the first arm and supports the transportation article; a first elastic body for pressing the transportation article in a direction toward the rotation axis by the first support; a second support which is attached to the second arm and supports the transportation article; and a second elastic body for pressing the transportation article in a direction toward the rotation axis by the second support.

4. The gripping mechanism according to claim 1, further including:
    a second rotating body provided so as to be rotatable about a second rotation axis;
    a third arm and a fourth arm disposed so as to be separated from the second rotation axis by the same distance, with the second rotation axis as a center, in order to grip a transportation article; and
    a second width adjusting mechanism which engages with the second rotating body, the third arm and the fourth arm, and which is configured such that the third arm and the fourth arm move toward the rotation axis in the case where the second rotating body rotates about the second rotation axis in a predetermined direction, and the third arm and the fourth arm move away from the rotation axis in the case where the second rotating body rotates about the second rotation axis in a direction opposite from the predetermined direction,
    wherein the moving directions of the first arm and the second arm and the moving directions of the third arm and the fourth arm have a perpendicular relationship.

5. The gripping mechanism according to claim 4, wherein the rotation axis and the second rotation axis are coaxial.

6. The gripping mechanism according to claim 4, wherein the rotation axis and the second rotation axis have a perpendicular relationship, and the second rotating body is attached to the first arm or the second arm.

7. A transportation article conveyance device comprising:
    the moving body constituted of an unmanned aerial vehicle; and
    a gripping mechanism which is attached to a lower part of the unmanned aerial vehicle and which is described in claim 1.

8. The transportation article conveyance device according to claim 7, wherein the gripping mechanism is installed such that a straight line which passes through the center of gravity of the unmanned aerial vehicle and which extends in a vertical direction coincides with the rotation axis.

\* \* \* \* \*